US010103638B1

United States Patent
Leong

(10) Patent No.: US 10,103,638 B1
(45) Date of Patent: Oct. 16, 2018

(54) FLYBACK CONVERTER WITH CAPACITOR MODULE AND SWITCHING MODULE

(71) Applicant: Infineon Technologies Austria AG, Villach (AT)

(72) Inventor: Kennith Kin Leong, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/673,089

(22) Filed: Aug. 9, 2017

(51) Int. Cl.
*H02M 3/335* (2006.01)
*H02M 1/42* (2007.01)
*H02M 1/00* (2006.01)

(52) U.S. Cl.
CPC ....... *H02M 3/3353* (2013.01); *H02M 1/4258* (2013.01); *H02M 3/33515* (2013.01); *H02M 3/33523* (2013.01); *H02M 3/33561* (2013.01); *H02M 3/33576* (2013.01); *H02M 3/33592* (2013.01); *H02M 2001/0009* (2013.01)

(58) Field of Classification Search
CPC .................. H02M 7/217; H02M 7/219; H02M 2001/0009
See application file for complete search history.

(56) References Cited

U.S. PATENT DOCUMENTS 5,345,374 A * 9/1994 Sato ..................... H02M 1/4258
363/133
5,994,847 A * 11/1999 Konopka .............. H02M 1/425
315/209 R
6,064,580 A * 5/2000 Watanabe ......... H02M 3/33592
363/127
6,069,798 A * 5/2000 Liu .................... H02M 3/33569
363/134
6,115,276 A * 9/2000 Mao ....................... H02J 9/062
363/127

(Continued)

OTHER PUBLICATIONS

Yeon, et al., "Design of Series Input Parallel Output Interleaved Flyback Converter for 75W AC-DC Adapter," 2012 IEEE Vehicle Power and Propulsion Conference, Oct. 9-12, 2012, pp. 1238-1243.

(Continued)

*Primary Examiner* — Yusef A Ahmed
(74) *Attorney, Agent, or Firm* — Shumaker & Sieffert, P.A.

(57) ABSTRACT

In an example, a circuit for voltage regulation includes a capacitor module, a multiple winding transformer, and a switching module. The capacitor module includes a first capacitor and a second capacitor. The multiple winding transformer includes a first primary side winding, a second primary side winding, and a secondary side winding. The switching module is configured to selectively switch the multiple winding transformer in a first state and a second state. During the first state, the switching module electrically couples the capacitor module to the multiple winding transformer. During the first state, the switching module electrically couples the first capacitor to the first primary side winding and electrically couples the second capacitor to the second primary side winding. During the second state, the switching module electrically couples the secondary side winding to a load. In another example, a circuit includes a voltage doubler module, transformer, and switching module.

16 Claims, 19 Drawing Sheets

(56) References Cited

U.S. PATENT DOCUMENTS

| | | | | |
|---|---|---|---|---|
| 6,349,044 B1* | 2/2002 | Canales-Abarca | H02M 1/34 | 363/134 |
| 8,503,199 B1* | 8/2013 | Chapuis | H02M 1/4225 | 363/21.06 |
| 8,625,310 B2* | 1/2014 | Jang | H02M 1/4241 | 363/131 |
| 8,901,839 B2* | 12/2014 | Luccato | H02M 3/335 | 315/209 R |
| 9,287,790 B2* | 3/2016 | Norisada | H02M 3/33546 | |
| 2002/0191422 A1* | 12/2002 | Takagi | H02M 3/33592 | 363/21.06 |
| 2004/0145930 A1* | 7/2004 | Noro | H02M 3/33576 | 363/127 |
| 2005/0141161 A1* | 6/2005 | Usui | H02M 1/32 | 361/93.1 |
| 2006/0050537 A1* | 3/2006 | Zeng | H02M 3/33569 | 363/16 |
| 2007/0247877 A1* | 10/2007 | Kwon | H02M 3/3372 | 363/25 |
| 2009/0290384 A1* | 11/2009 | Jungreis | H02M 1/4241 | 363/17 |
| 2010/0002480 A1* | 1/2010 | Huynh | H02M 3/335 | 363/90 |
| 2011/0194317 A1* | 8/2011 | Truettner | H02M 3/33569 | 363/21.18 |
| 2011/0280048 A1* | 11/2011 | Fujiyoshi | H02M 1/34 | 363/21.04 |
| 2012/0176060 A1* | 7/2012 | Luccato | H02M 3/335 | 315/291 |
| 2014/0009968 A1* | 1/2014 | Matsuura | H02M 3/33507 | 363/17 |
| 2014/0049990 A1* | 2/2014 | Limpaecher | H02M 3/24 | 363/15 |
| 2015/0131337 A1* | 5/2015 | Gabrielsson | H02M 1/4241 | 363/21.03 |
| 2016/0099647 A1* | 4/2016 | Zhang | H02M 3/33569 | 363/21.12 |
| 2016/0181825 A1* | 6/2016 | Herrmann | H02J 5/005 | 307/104 |
| 2017/0353116 A1* | 12/2017 | Zhang | H02M 1/08 | |

OTHER PUBLICATIONS

Pesonen, "Improving the Performance of Traditional Flyback-Topology with Two-Switch-Approach," Texas Instruments, Application Report, SNVA716, Jul. 2014, 13 pp.

Oh, "Lossless Snubber Circuit in Flyback Converter and Its Utilization for a Low Operating Voltage," Fairchild Semiconductor, Jul. 2005, 6 pp.

* cited by examiner

US 10,103,638 B1

FLYBACK CONVERTER WITH CAPACITOR MODULE AND SWITCHING MODULE

TECHNICAL FIELD

This disclosure relates to power converters, and more particular, to techniques and circuits associated with Flyback converters.

BACKGROUND

A Flyback converter may be used to output a regulated voltage or a regulated current. Flyback converters use a transformer, which provides galvanic isolation between an input voltage source and the regulated output voltage.

SUMMARY

The disclosure describes techniques, devices, and systems for improving an efficiency in Flyback converters. In some examples, a circuit for a power converter may include a multiple winding transformer having a first primary side winding and a second primary side winding. In this example, a first capacitor is coupled to the first primary side winding and a second capacitor is coupled to the second primary side winding. In this way, the first primary side winding may be used to recuperate leakage inductance energy from the multiple winding transformer into the first capacitor and the second primary side winding may be used to recuperate leakage inductance energy from the multiple winding transformer into the second capacitor. Additionally, the multiple winding transformer may balance a charge stored in the first capacitor and the second capacitor, thereby allowing smaller capacitance compared to Flyback converter topologies that do not balance the charge stored in the first capacitor and the second capacitor.

In an example, a circuit for voltage regulation includes a capacitor module, a multiple winding transformer, and a switching module. The capacitor module includes a first capacitor and a second capacitor. The multiple winding transformer includes a first primary side winding, a second primary side winding, and a secondary side winding. The switching module is configured to selectively switch the multiple winding transformer in a first state and a second state. During the first state, the switching module electrically couples the capacitor module to the multiple winding transformer such that the capacitor module charges a magnetic field of the multiple winding transformer. During the first state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor. During the second state, the switching module electrically couples the secondary side winding to a load such that the magnetic field of the multiple winding transformer discharges to the secondary side winding to provide a regulated voltage to the load.

In another example, a method for voltage regulation includes selectively switching, by a switching module, a multiple winding transformer in a first state and a second state. The multiple winding transformer includes a first primary side winding, a second primary side winding, and a secondary side winding. Selectively switching the multiple winding transformer in the first state includes electrically coupling a capacitor module to the multiple winding transformer such that the capacitor module charges a magnetic field of the multiple winding transformer. The capacitor module includes a first capacitor and a second capacitor. Selectively switching the multiple winding transformer in the first state includes electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor. Selectively switching the multiple winding transformer in the second state includes electrically coupling the secondary side winding to a load such that the magnetic field of the multiple winding transformer discharges to the secondary side winding to provide a regulated voltage to the load.

In another example, a circuit for voltage regulation includes a voltage doubler module, a transformer, and a switching module. The voltage doubler module includes a first capacitor configured to receive power from an alternating current output by a voltage source when the alternating current output by the voltage source is positive and a second capacitor configured to receive power from an alternating current output by a voltage source when the alternating current output by the voltage source is negative. A positive terminal of the second capacitor is electrically coupled to a negative terminal of the first capacitor. The transformer includes a primary side winding and a secondary side winding. The switching module is configured to selectively couple the primary side winding to the capacitor module to regulate a voltage at the secondary side winding.

Details of these and other examples are set forth in the accompanying drawings and the description below. Other features, objects, and advantages will be apparent from the description and drawings, and from the claims.

DETAILED DESCRIPTION

In general, this disclosure is directed to techniques for improving an efficiency in Flyback converters by recuperating the leakage inductance energy that is commonly lost in the snubber circuit. Furthermore, some techniques described herein have a controllable transformer ratio that may further reduce transformer losses compared to converters that do not have a controllable transformer ratio.

Some systems may recuperate leakage inductance energy using additional inductors that return energy back to an input capacitor after three separate operations. Additionally some systems may operate a Flyback converter with a low turn ratio. For example, the primary side winding may be split into two Flyback converters operating in series and two secondary side windings operating in parallel. However, in order to achieve both switchable turn ratio and energy recuperation, such systems may use additional components, resulting in a higher component count than systems that do not achieve both switchable turn ratio and energy recuperation.

One or more techniques described herein, combine a switchable primary turn ratio together with a leakage inductance energy recuperating circuit together to achieve higher efficiencies than systems that do not achieve both switchable turn ratio and energy recuperation. Furthermore, in combination with a voltage doubler, the input voltage of the Flyback converter described herein may be increased to further increase efficiencies compared to systems that do not include a voltage doubler.

Figure 1:
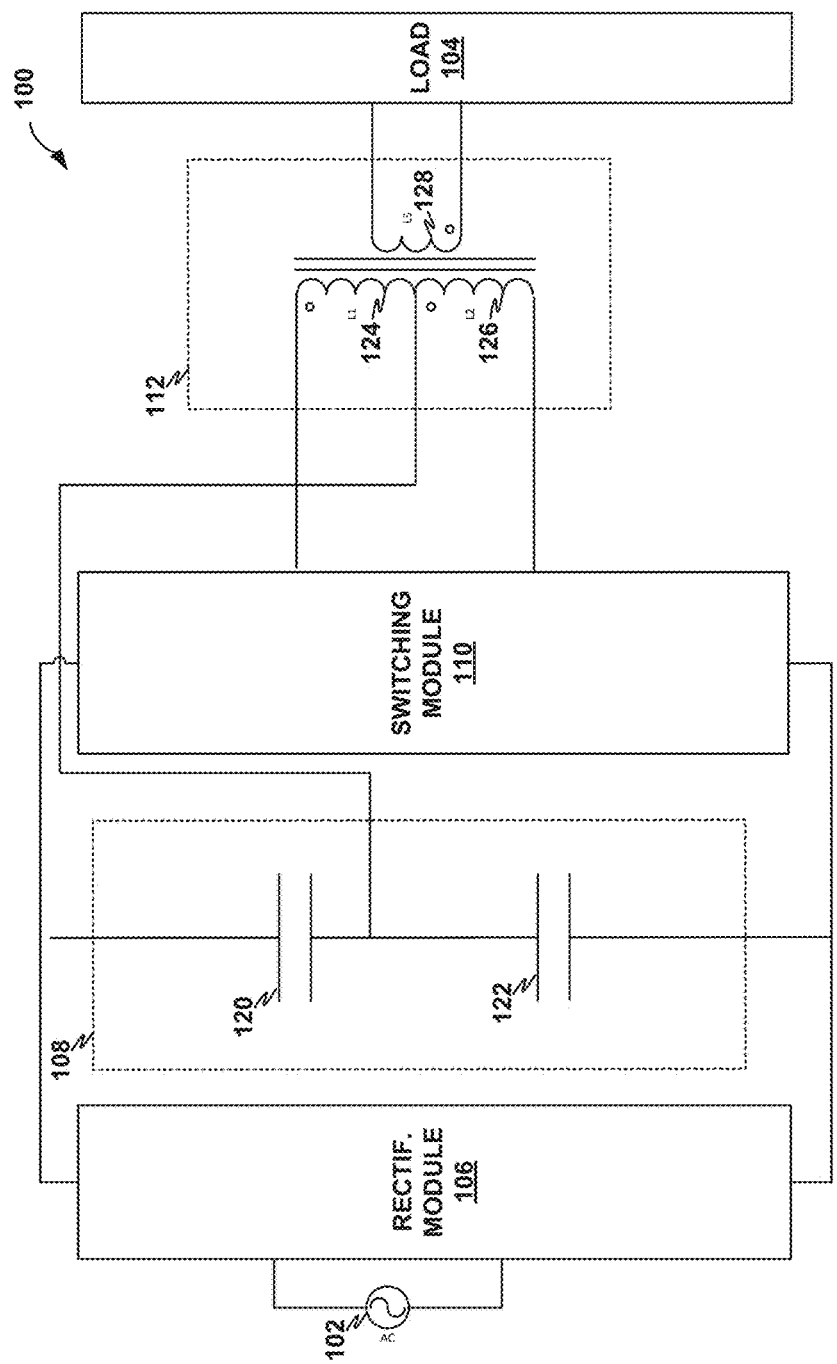
FIG. 1 is a block diagram illustrating an example system configured for a power converter using a multiple winding transformer, in accordance with one or more techniques of this disclosure.

FIG. 1 is a block diagram illustrating an example system 100 configured for a power converter using a multiple winding transformer, in accordance with one or more techniques of this disclosure. As shown system 100 may include voltage source 102, load 104, rectification module 106, capacitor module 108, switching module 110, and multiple winding transformer 112. System 100 may include additional components. For example, system 100 may include a synchronous rectifier and/or capacitor at the secondary side of multiple winding transformer 112. It should be understood that zero voltage switching may be possible with the techniques described herein.

Voltage source 102 may be an output from any suitable electrical grid. For example, the output may be ~120 Vac at ~60 Hz, ~230 Vac at ~50 Hz, or another voltage and frequency. In some examples, voltage source 102 may be configured to supply a voltage in a first direction during a first half of a cycle and supply voltage in a second direction during a second half of the cycle, the first direction being opposite from the second direction. For instance, voltage source 102 may be configured to supply a sine wave that includes a positive current (e.g., first direction) flowing from a first node of voltage source 102 to a second node of voltage source 102 during a first half (e.g., 0 to $\pi$) of a cycle of the sine wave and a negative current (e.g., second direction) flowing from the second node of voltage source 102 to the first node of voltage source 102 during a second half (e.g., $\pi$ to $2\pi$) of the cycle of the sine wave.

Load 104 may be any suitable device configured to use power output by a secondary side of multiple winding transformer 112. In some examples, load 104 may include an electronic device. Examples of electronic devices may include, but are not limited to, mobile devices (e.g., smart phones, tablets, wearable devices, or another mobile device), computing devices (e.g., laptop, notebook, portable personal computer, or another computing device), batteries (e.g., nickel-cadmium, lead-acid, nickel-metal hydride, nickel-zinc, silver-oxide, lithium-ion, lithium polymer, or another battery), speakers, or another electronic device.

Rectification module 106 may be configured to receive an AC voltage from voltage source 102 and to provide a rectified AC voltage to one or more other components of system 100. For example, rectification module 106 may be configured to supply electrical power to capacitor module 108. Examples of rectification module 106 may include, but are not limited to, single-phase rectifier (e.g., bridge, half wave, full wave, or another single-phase rectifier), three-phase rectifier (e.g., half wave, full wave, bridge, or another three-phase rectifier), or another device configured to supply electrical power to capacitor module 108.

Capacitor module 108 may include capacitor 120 and capacitor 122. In other examples, capacitor module 108 may include additional capacitors. For example, capacitor module 108 may include a capacitor coupled in parallel with the series combination of capacitors 120 and 122. Capacitors 120 and 122 may each include electrical components configured to store electrical energy in an electric field. Examples of an electrical component configured to store electrical energy in an electric field may include, but are not limited to, ceramic capacitors, film capacitors, electrolytic capacitors (e.g., aluminum, tantalum, niobium, or another electrolytic capacitor), super capacitors (e.g., double layer, pseudocapacitors, hybrid capacitors, or another super capacitor), mica capacitors, or another electrical component configured to store electrical energy in an electric field. For example capacitor 120 may be an aluminum electrolytic capacitor having a voltage rating of ~400 volts and a capacitance of ~2.2 µF. Although capacitors 120 and 122 may be described as a single capacitor, capacitors 120 and 122 may each be an array of capacitive elements. For instance, capacitor 120 may be an array of capacitive elements coupled in parallel and/or series. In some instances, each capacitive element may be a discrete component, while in other instances, each one of the capacitive elements may be contained within a single package (e.g., capacitor array).

Multiple winding transformer 112 may include first primary side winding 124, second primary side winding 126, and secondary side winding 128. Although FIG. 1 illustrates multiple winding transformer 112 as having 3 windings, multiple winding transformer 112 may include additional windings, for instance, but not limited to tertiary windings, a third primary side winding, a second secondary side winding, and other windings.

Switching module 110 may be configured to selectively switch multiple winding transformer 112. Switching module 110 may include one or more switching elements. Examples of switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that the switching elements may include a high side switch or low side switch. Additionally, although examples may illustrate switching elements as being voltage-controlled, in some examples, switching elements may be current-controlled. Other semiconductor types can also be used, such as, gallium nitride (GaN), silicon carbide (SiC). Examples of current-controlled elements may include, but are not limited to high electron mobility transistors (HEMTs), BJTs, or other current-controlled elements. Additionally, switching module 110 may include one or more diodes.

In accordance with one or more techniques described herein, switching module 110 may be configured to selectively switch multiple winding transformer 112 in a first state and a second state. During the first state, switching module 110 electrically couples capacitor module 108 to multiple winding transformer 112 such that capacitor module 108 charges a magnetic field of multiple winding transformer 112. During the first state, switching module 110 electrically couples capacitor 120 to first primary side winding 124 and electrically couples capacitor 122 to second primary side winding 126 such that power flows from capacitor 120 to capacitor 122 when capacitor 120 has a higher voltage than capacitor 122 and such that power flows from capacitor 122 to capacitor 120 when capacitor 122 has a higher voltage than capacitor 120. During the second state, switching module 110 electrically couples secondary side winding 128 to load 104 such that the magnetic field of multiple winding transformer 112 discharges to secondary side winding 128 to provide a regulated voltage to load 104.

Figure 2:
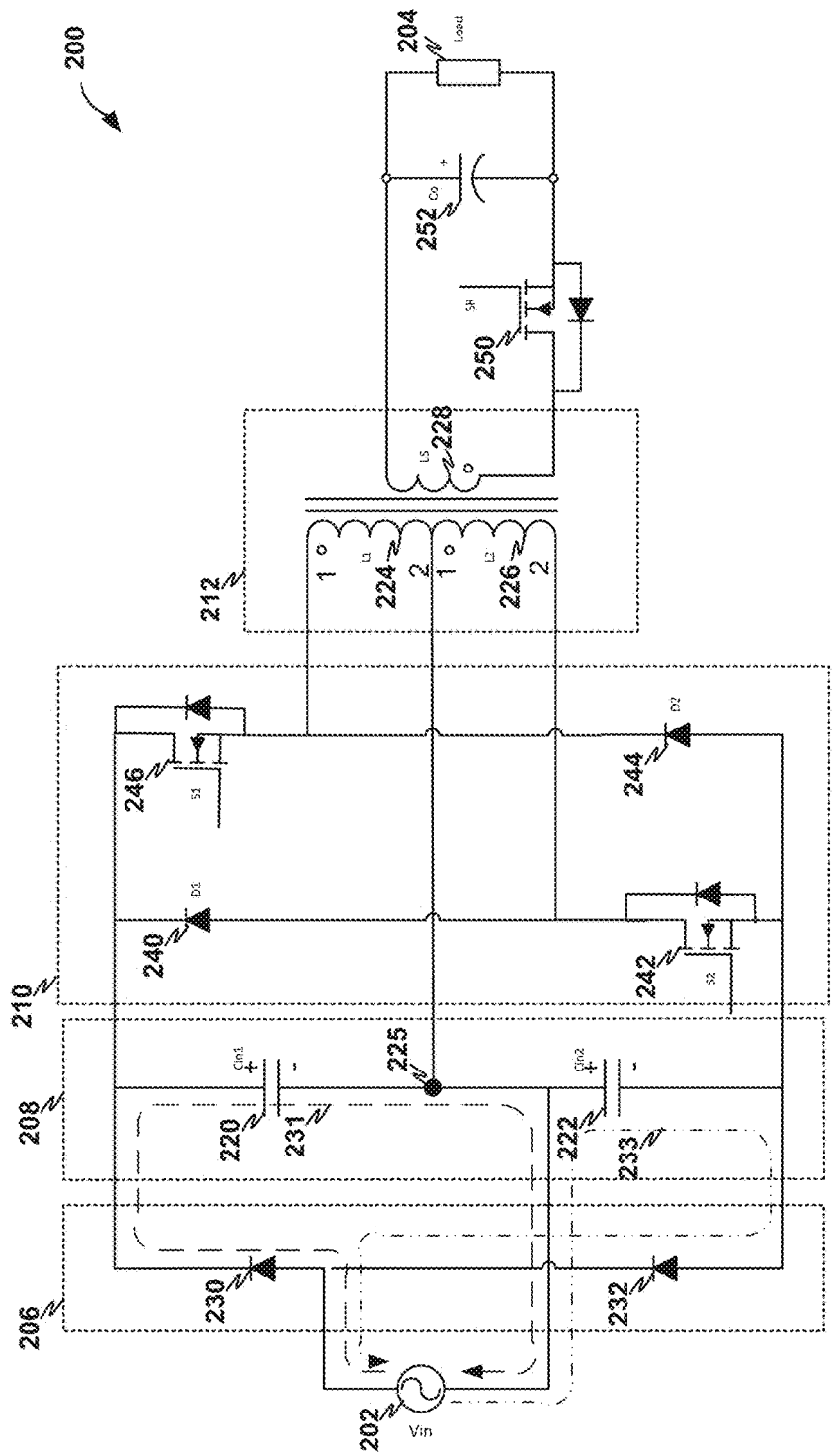
FIG. 2 is a circuit diagram illustrating an example Flyback converter using a voltage doubler and a center tap transformer, in accordance with one or more techniques of this disclosure.

FIG. 2 is a circuit diagram illustrating an example Flyback converter using a voltage doubler and a center tap transformer, in accordance with one or more techniques of this disclosure. As shown circuit 200 may include voltage source 202, load 204, rectification module 206, capacitor module 208, switching module 210, multiple winding transformer 212, synchronous rectifier 250, and capacitor 252. Voltage source 202 may be an example of voltage source 102 of FIG. 1. Rectification module 206 may be an example of rectification module 106 of FIG. 1. Capacitor module 208 may be an example of capacitor module 108 of FIG. 1. For example, capacitor module 208 may include capacitor 220 and capacitor 222. Switching module 210 may be an example of switching module 110 of FIG. 1. Multiple winding transformer 212 may be an example of multiple winding transformer 112 of FIG. 1. For example, multiple winding transformer 212 may include first primary side winding 224, second primary side winding 226, and secondary side winding 228. Synchronous rectifier 250 may be an actively controlled switching element configured to act as a rectifier. For instance, synchronous rectifier 250 may be activated to allow current in one direction and deactivated to block current in the other direction.

Rectification module 206 may be configured to generate rectified current 231 to charge capacitor 220 using an alternating current flowing when the alternating current flows in a first direction and generate rectified current 233 to charge capacitor 222 using the alternating current when the alternating current flows in a second direction that is opposite to the first direction. As shown, rectification module 206 may include diode 230 and diode 232. In the example of FIG. 2, diode 230 is configured to generate a channel for rectified current 231 and to block rectified current 233. In this example, diode 232 may be configured to generate a channel for rectified current 233 and to block rectified current 231.

As shown in FIG. 2, capacitor 220 includes a positive terminal and a negative terminal and capacitor 222 includes a positive terminal and a negative terminal. Additionally, first primary side winding 224 includes a first node and a second node and second primary side winding 226 includes a first node and a second node. In the example of FIG. 2, the second node of first primary side winding 224, the first node of second primary side winding 226, the negative terminal of capacitor 220, and the positive terminal of capacitor 222 are coupled together at mid-point connection 225. In some examples, mid-point connection 225 may be positioned at an exact middle point of a primary side winding comprising first primary side winding 324 and second primary side winding 326, however, in other examples mid-point connection 225 may be positioned at a different point.

Switching module 210 includes diode 240, switching element 242, diode 244, and switching element 246. In the example of FIG. 2, a cathode of diode 240 is coupled to the positive terminal of capacitor 220 and the anode of diode 240 is coupled to the second node of second primary side winding 226. In this example, a drain of first switching element 242 is coupled to the anode of diode 240 and a source of switching element 242 is coupled to the negative terminal of capacitor 222. Similarly, as shown, an anode of diode 244 is coupled to the negative terminal of capacitor 222 and the cathode of diode 244 is coupled to the first node of first primary side winding 224. In this example, a drain of switching element 246 is coupled to the positive terminal of capacitor 220 and a source of switching element 246 is coupled to the cathode of diode 244.

Rather than necessarily designing multiple winding transformer 212 to satisfy a high line voltage (e.g., 240 Vrms) and a current at a low line voltage (e.g., 120 Vrms), circuit 200 permits designing multiple winding transformer 212 to satisfy a high line voltage (e.g., 240 Vrms) and a current at the high line voltage (e.g., 240 Vrms). For example, switching module 210 may operate using an interleaving control scheme when voltage source 202 outputs a high line voltage and may operate using a non-interleaving control scheme when voltage source 202 outputs a low line voltage, thereby resulting in a voltage at multiple winding transformer 212 being equivalent to high line voltage when the high line voltage is double the low line voltage.

In this way, circuit 200 may represent a system having the following benefits. Multiple winding transformer 212 may be designed for only a "High line voltage" of voltage source 202. Rectification module 206 may have half the bridge diode losses compared to circuits that omit a voltage doubler. Switching module 210 may be switched to allow recirculating current to capacitor 220 and capacitor 222 during turn off, thereby reducing snubber losses compared to circuits that omit a voltage doubler. Circuit 200 may allow for a smaller capacitance at capacitor module 208. For example, a capacitance at capacitors 220 and 222 may be 40 uF for a 65 W (e.g., design for full power, stable operation at 90 Vrms). Diodes 240 and 244 may only conduct leakage inductance current, thereby reducing loses compared to circuits that omit a voltage doubler. A control of switching module 210 may be simplified by modifying existing controllers (e.g., similar control as existing Flyback converters).

FIGS. 3A-3F are circuit diagrams illustrating an interleaving control scheme, in accordance with one or more techniques of this disclosure. As shown circuit 300 may include load 304, capacitor module 308, switching module 310, multiple winding transformer 312, synchronous rectifier 350. Capacitor module 308 may be an example of capacitor module 108 of FIG. 1 and/or capacitor module 208 of FIG. 2. For example, capacitor module 308 may include capacitor 320 and capacitor 322. Switching module 310 may be an example of switching module 110 of FIG. 1 and/or switching module 210 of FIG. 2. For example, switching module 310 may include switching element 342, switching element 346, diode 340, and diode 342. Multiple winding transformer 312 may be an example of multiple winding transformer 112 of FIG. 1 and/or multiple winding transformer 212 of FIG. 2. For example, multiple winding transformer 312 may include first primary side winding 324, second primary side winding 326, and secondary side winding 328. In the example of FIGS. 3A-3F, the second node of first primary side winding 324, the first node of second primary side winding 326, the negative terminal of capacitor 320, and the positive terminal of capacitor 322 are coupled together at mid-point connection 325.

A high line operation of the circuit 300 may be different compared to low line. Energy may be taken from capacitor 320 and capacitor 322 alternatively instead of in series, this can be seen from the basic operation presented in FIG. 3A-3F.

Figure 3A:
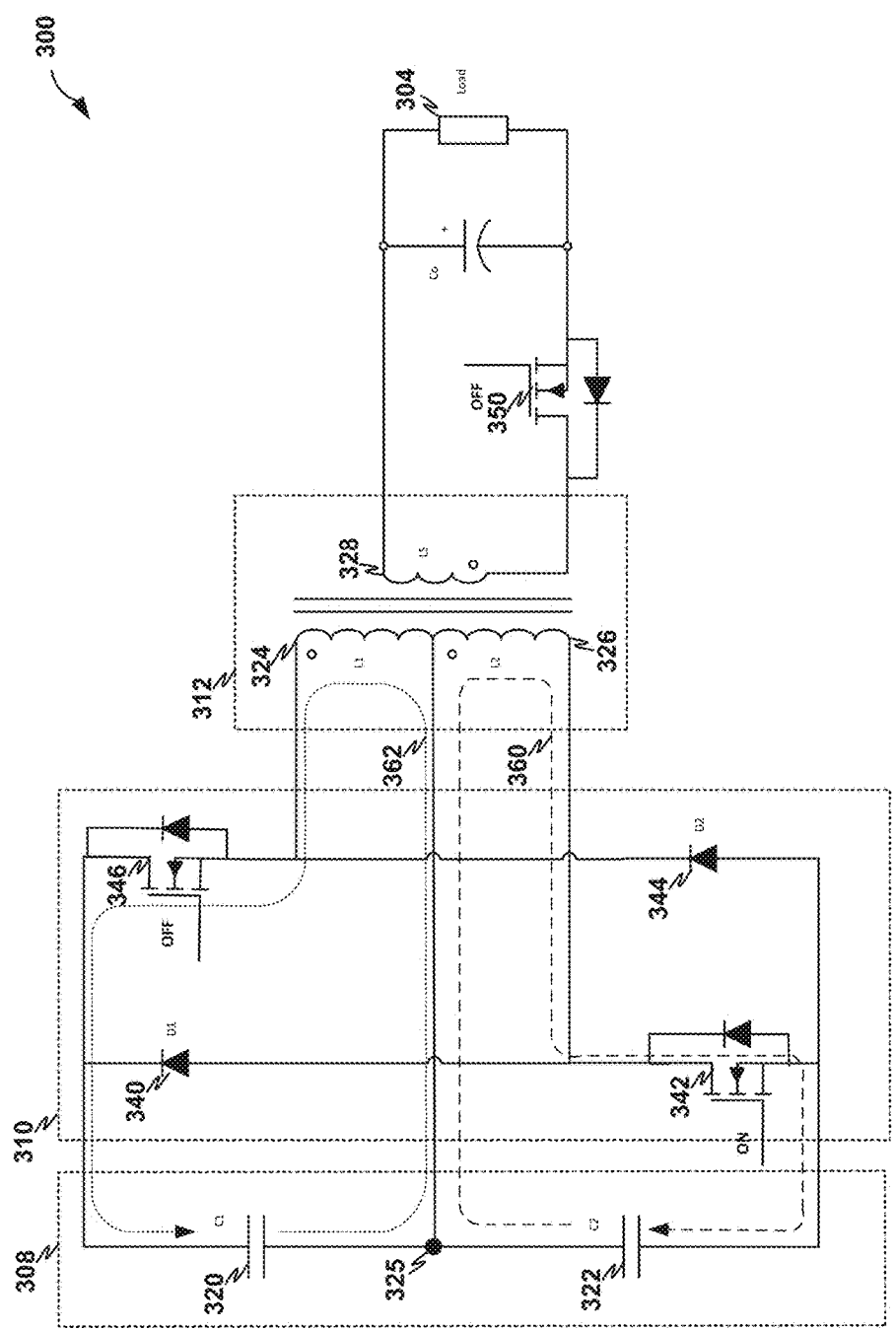
FIGS. 3A-3F are circuit diagrams illustrating an interleaving control scheme, in accordance with one or more techniques of this disclosure.

FIG. 3A is a circuit diagram illustrating a first interleaving state for an exemplary interleaving control scheme. In the first interleaving state, switching element 342 is turned ON and conducts current from capacitor 322, energizing second primary side winding 326 which is half of the primary side winding of multiple winding transformer 312. Said differently, for example, switching module 310 is configured to electrically couple capacitor 322 to multiple winding transformer 312 such that capacitor 322 charges the magnetic field of multiple winding transformer 312. As shown, capacitor 322 generates current 360, which charges the magnetic field of multiple winding transformer 312.

During the first interleaving state, switching module 310 may electrically couple capacitor 320 to first primary side winding 324 and may electrically couple capacitor 322 to second primary side winding 326 such that power flows from capacitor 320 to capacitor 322 when capacitor 320 has a higher voltage than capacitor 322 and such that power flows from capacitor 322 to capacitor 320 when capacitor 322 has a higher voltage than capacitor 320. In the example of FIG. 3A, capacitor 322 has a higher voltage than capacitor 320. As such, in this example, power flows from capacitor 322 to capacitor 320 as shown by current 362.

Figure 3B:
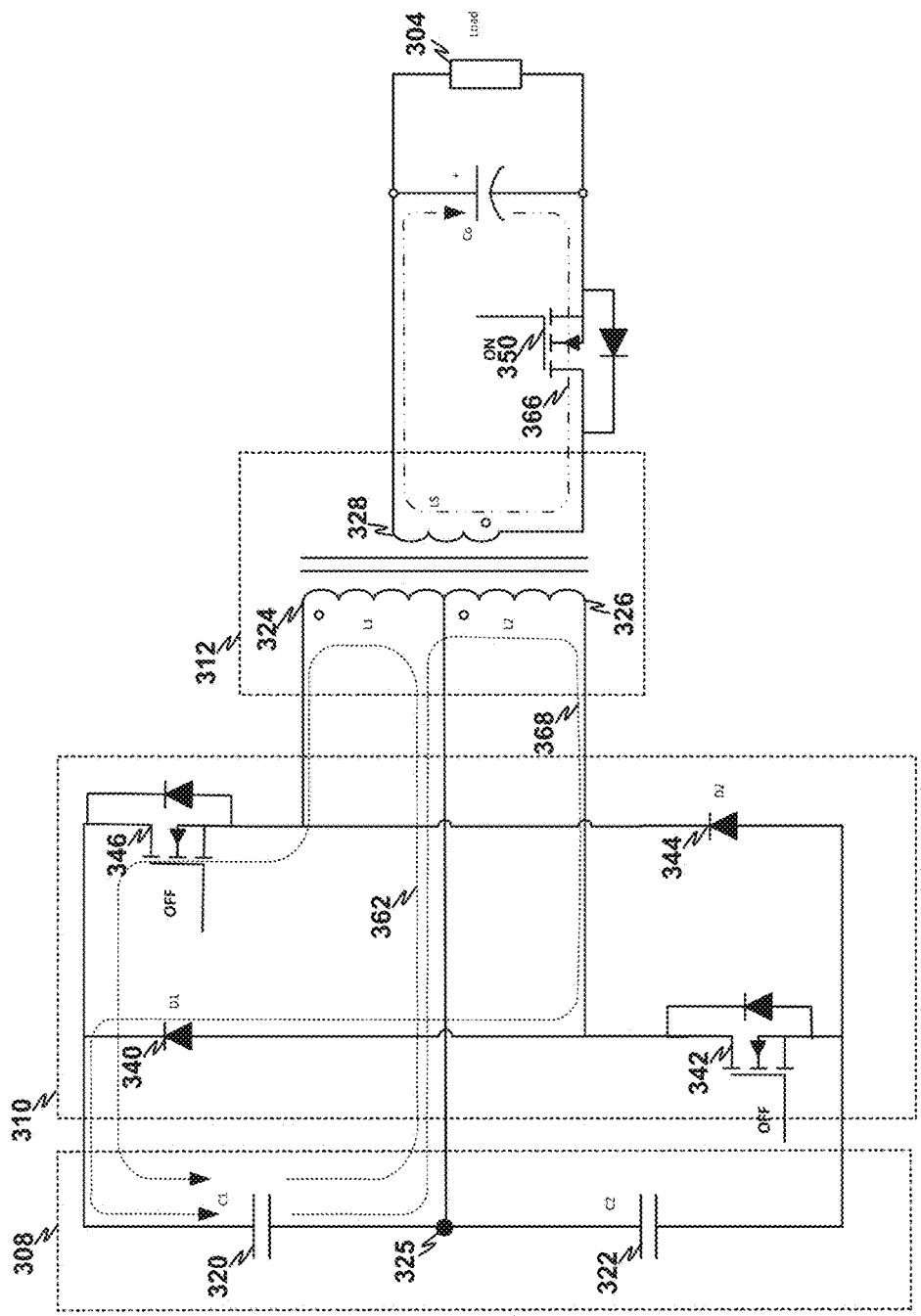

FIG. 3B is a circuit diagram illustrating a first portion of a second interleaving state for an exemplary interleaving control scheme. When switching element 342 is turned OFF at the first portion of a second interleaving state, the leakage inductance current continues to flow in second primary side winding 326. However because switching element 342 is now OFF, current is forced to conduct via diode 340 and into the capacitor 320 via mid-point connection 325. Therefore the leakage inductance energy recirculates from second primary side winding 326 to capacitor 320 without dissipation unlike a snubber circuit. At the same time, the stored energy in second primary side winding 326 begins to conduct on the secondary side winding 328 via synchronous rectifier 350. Said differently, for example, switching module 310 electrically couples secondary side winding 328 to load 304 such that the magnetic field of multiple winding transformer 312 discharges to secondary side winding 328 to provide a regulated voltage to load 304 as shown by current 366. Additionally, in the example of FIG. 3B, during the first portion of the second interleaving state, switching module 310 may generate a channel for recuperating leakage inductance energy from second primary side winding 326 to capacitor 320 as shown by current 368. In the example of FIG. 3B, during the first portion of the second interleaving state, current 362 of FIG. 3A that previously flowed through first primary side winding 324 into capacitor 320 may continue to flow for a short time.

Figure 3C:
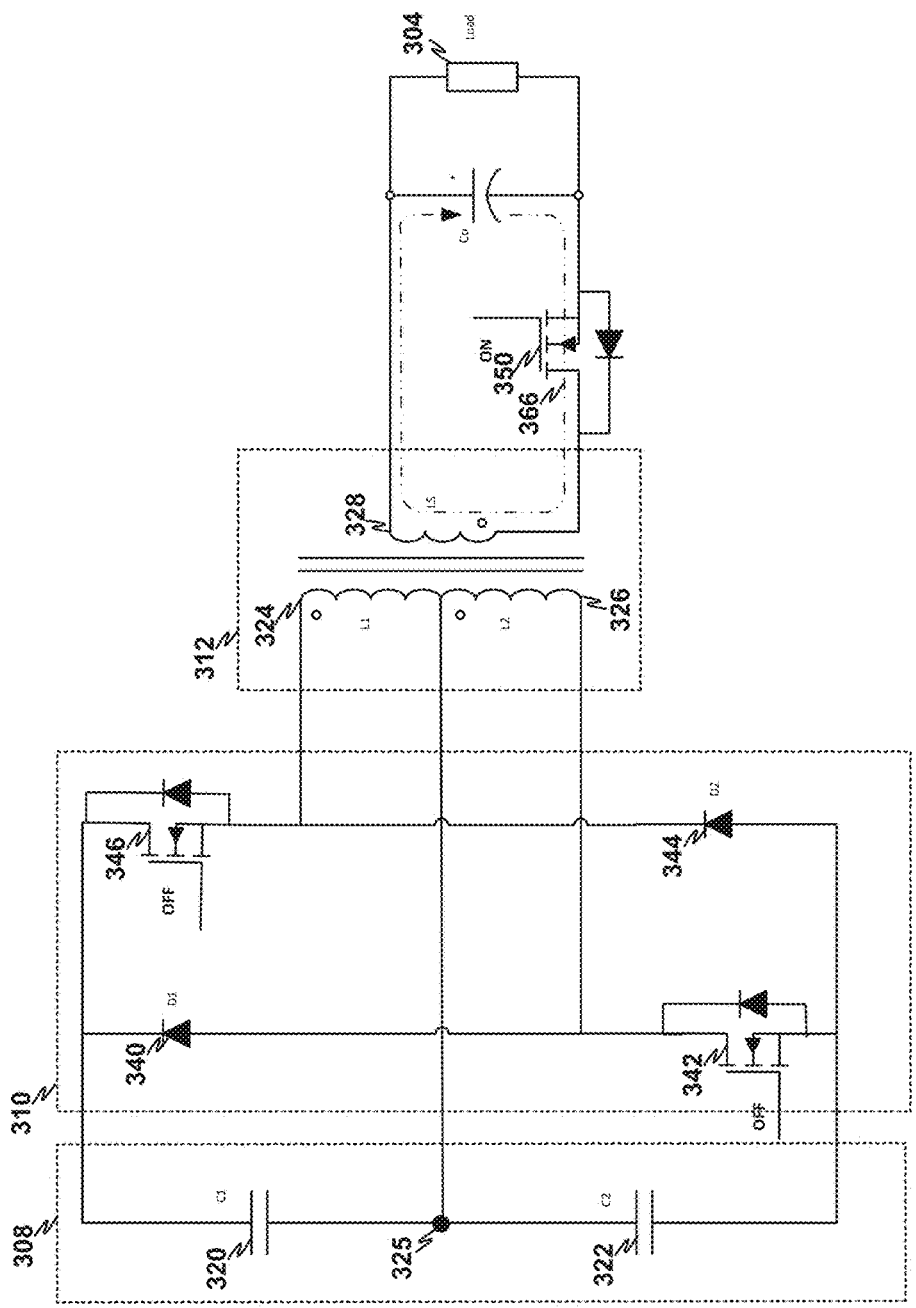

FIG. 3C is a circuit diagram illustrating a second portion of the second interleaving state for an exemplary interleaving control scheme. In a second portion of the second interleaving state, the leakage inductance current stop flowing into capacitor 320 and only synchronous rectifier 350 is conducting. Said differently, for example, switching module 310 electrically couples secondary side winding 328 to load 304 such that the magnetic field of multiple winding transformer 312 discharges to secondary side winding 328 to provide a regulated voltage to load 304 as shown by current 366.

Figure 3D:
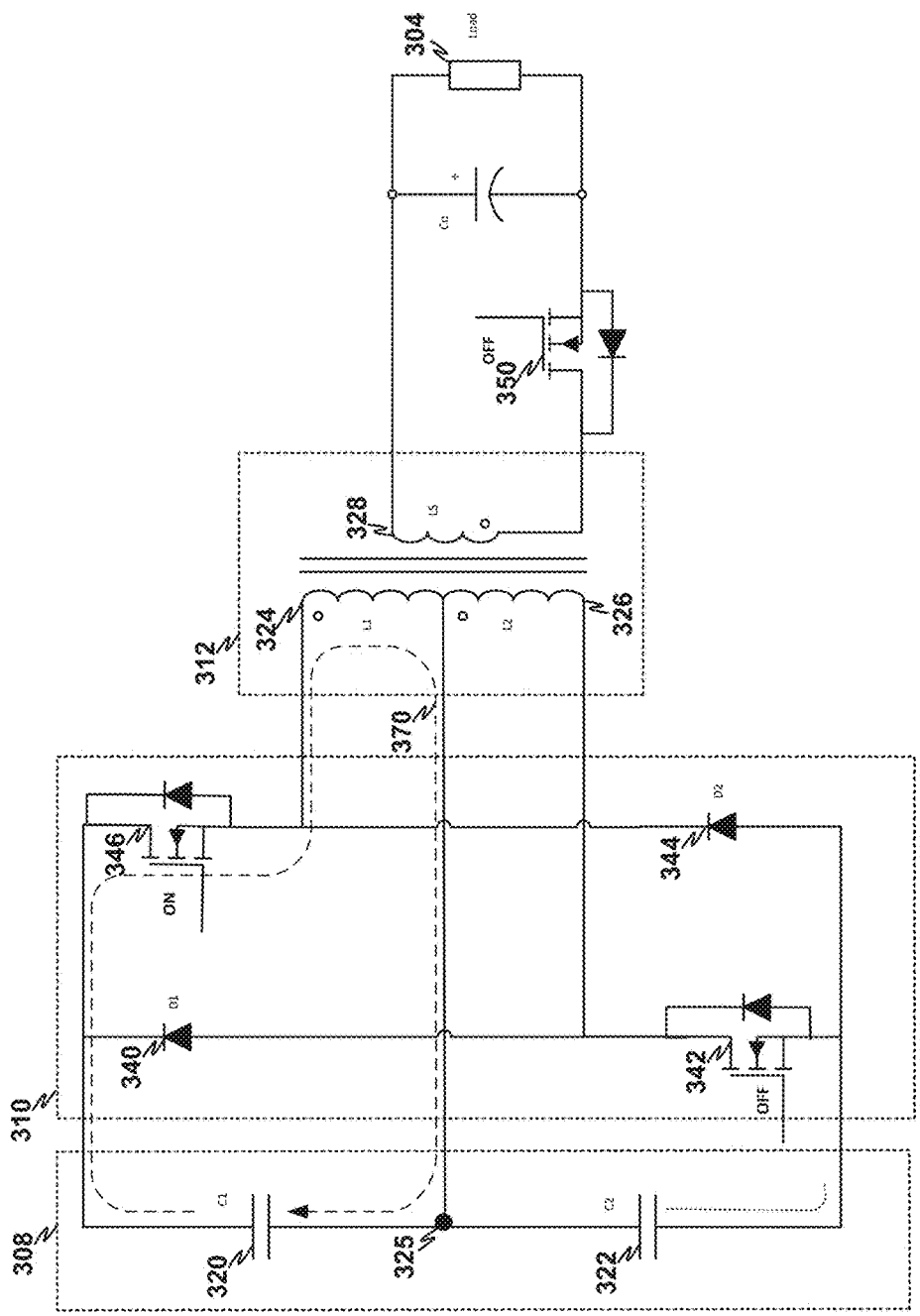

FIG. 3D is a circuit diagram illustrating a third interleaving state for an exemplary interleaving control scheme. The mirror operation occurs from third interleaving state to fourth interleaving state where switching element 346 is ON which takes energy from capacitor 320 via first primary side winding 324. Said differently, for example, switching module 310 is configured to electrically couple capacitor 320 to multiple winding transformer 312 such that capacitor 320 charges the magnetic field of multiple winding transformer 312. As shown, capacitor 320 generates current 370, which charges the magnetic field of multiple winding transformer 312.

During the third interleaving state, switching module 310 may electrically couple capacitor 320 to first primary side winding 324 and may electrically couple capacitor 322 to second primary side winding 326 such that power flows from capacitor 320 to capacitor 322 when capacitor 320 has a higher voltage than capacitor 322 and such that power flows from capacitor 322 to capacitor 320 when capacitor 322 has a higher voltage than capacitor 320. In the example of FIG. 3D, capacitor 320 has a voltage that is not higher than capacitor 322. As such, in this example, no power flows from capacitor 320 to capacitor 322.

Figure 3E:
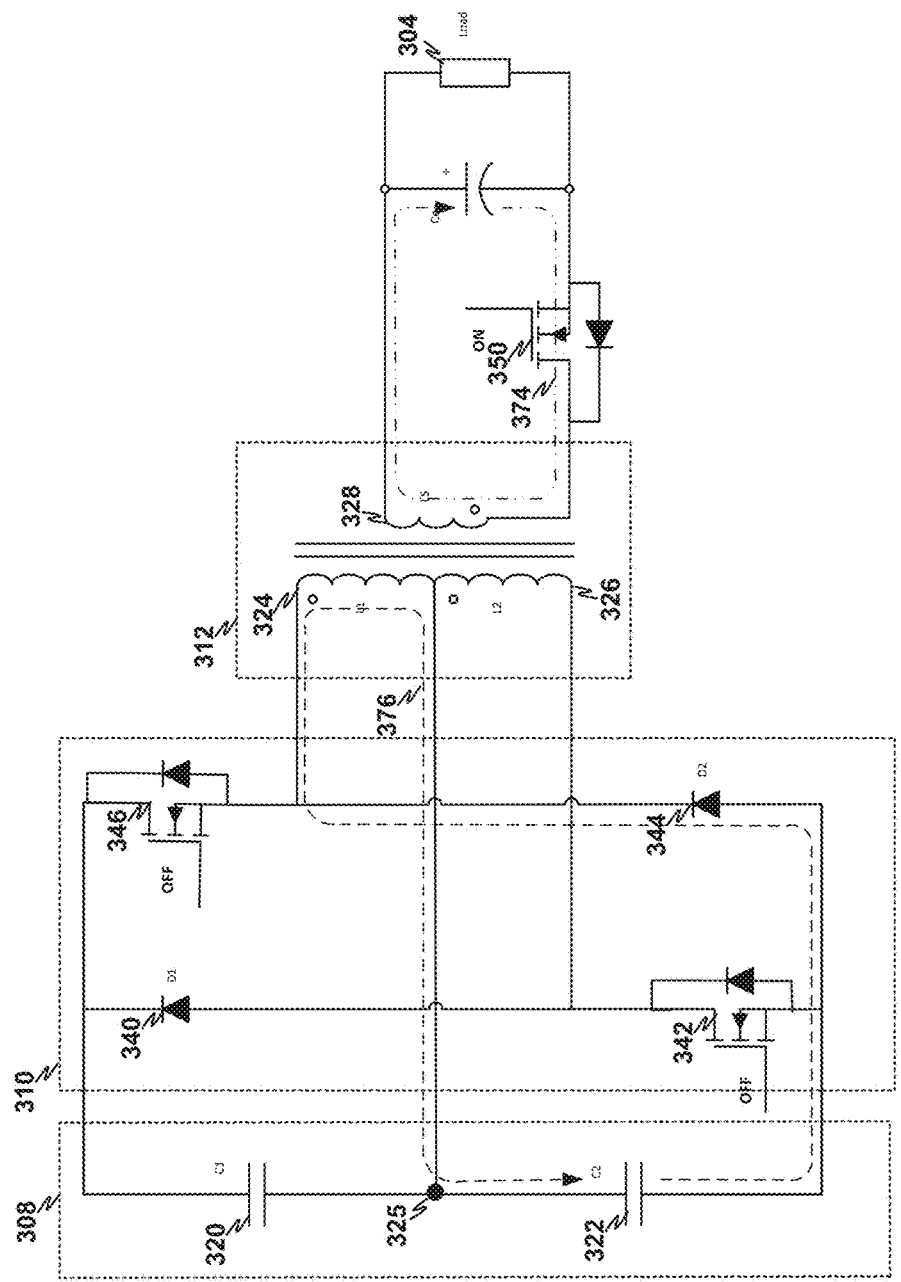

FIG. 3E is a circuit diagram illustrating a first portion of a fourth interleaving state for an exemplary interleaving control scheme. As shown in FIG. 3E, when switching element 346 is OFF, the leakage inductance energy recirculates to capacitor 322 via diode 344 from primary side ground. The secondary side winding 328 may behave the in a similar way for the fourth interleaving state as the second interleaving state. For example, switching module 310 may electrically couple secondary side winding 328 to load 304 such that the magnetic field of multiple winding transformer 312 discharges to secondary side winding 328 to provide a regulated voltage to load 304 as shown by current 374. Additionally, in the example of FIG. 3E, during the second interleaving state, switching module 310 may generate a channel for recuperating leakage inductance energy from second primary side winding 326 to capacitor 322 as shown by current 376.

Figure 3F:
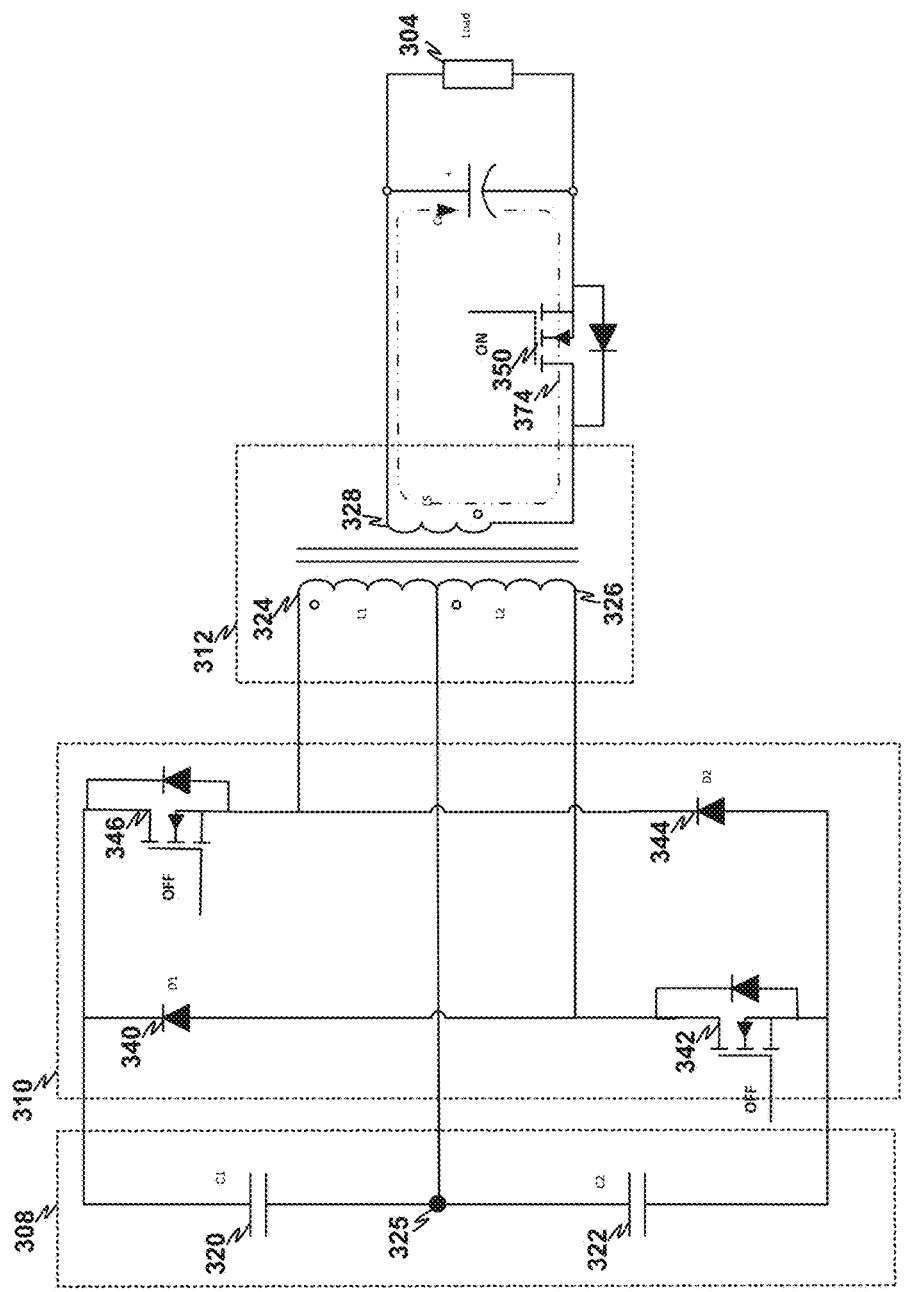

FIG. 3F is a circuit diagram illustrating a second portion of the fourth interleaving state for an exemplary interleaving control scheme. In the example of FIG. 3F, switching module 310 electrically couples secondary side winding 328 to load 304 such that the magnetic field of multiple winding transformer 312 discharges to secondary side winding 328 to provide a regulated voltage to load 304 as shown by current 374. However, in the example of FIG. 3F, during the fourth interleaving state, leakage inductance energy has stopped flowing from second primary side winding 326 to capacitor 322.

Figure 4:
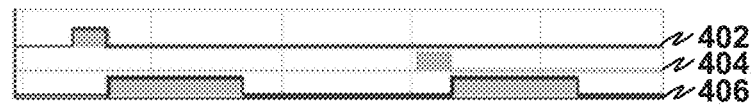
FIG. 4 is a graphical illustration of an example switching signal for an interleaving control scheme, in accordance with one or more techniques of this disclosure.

FIG. 4 is a graphical illustration of an example switching signal for an interleaving control scheme, in accordance with one or more techniques of this disclosure. The abscissa axis (e.g., horizontal) of FIG. 4 represents time and the ordinate axis (e.g., vertical) of FIG. 4 represents a gate signal 402 applied to switching element 346, a gate signal 404 applied to switching element 342, and a gate signal 406 applied to synchronous rectifier 350.

Figure 5:
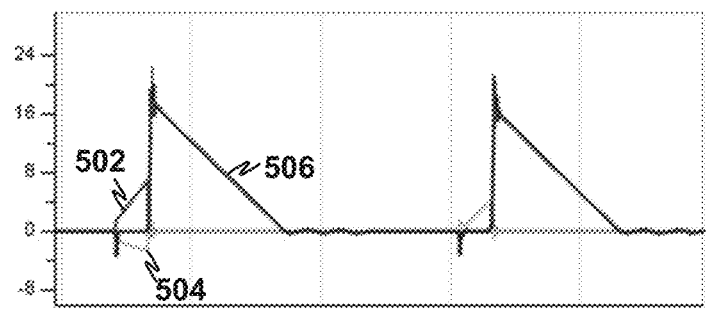
FIG. 5 is a graphical illustration of example current responses for the switching signal of FIG. 4, in accordance with one or more techniques of this disclosure.

FIG. 5 is a graphical illustration of example current responses for the switching signal of FIG. 4, in accordance with one or more techniques of this disclosure. The abscissa axis (e.g., horizontal) of FIG. 5 represents time and the ordinate axis (e.g., vertical) of FIG. 5 represents a current 502 at first primary side winding 324, a current 504 at second primary side winding 326, and a current 506 at secondary side winding 328.

Figure 6:
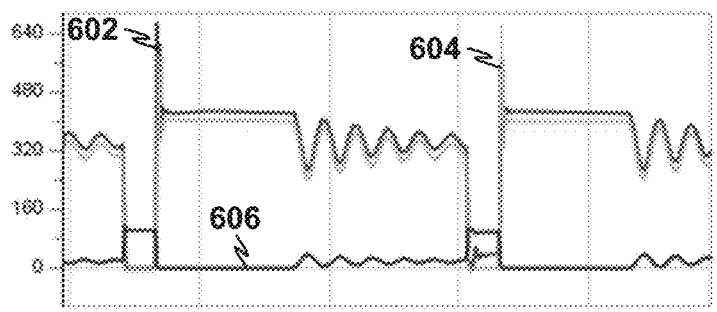
FIG. 6 is a graphical illustration of example voltage responses for the switching signal of FIG. 4, in accordance with one or more techniques of this disclosure.

FIG. 6 is a graphical illustration of example voltage responses for the switching signal of FIG. 4, in accordance with one or more techniques of this disclosure. The abscissa axis (e.g., horizontal) of FIG. 6 represents time and the ordinate axis (e.g., vertical) of FIG. 6 represents a drain to source voltage 602 at switching element 346, a drain to source voltage 604 at switching element 342, and a drain to source voltage 606 at synchronous rectifier 350.

Figure 7:
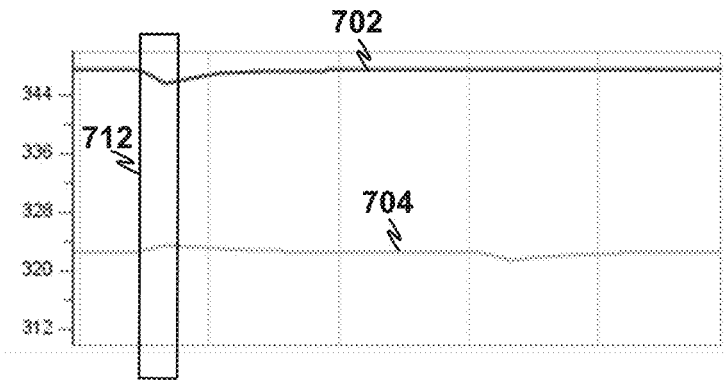
FIG. 7 is a graphical illustration of example capacitor voltage responses for the switching signal of FIG. 4, in accordance with one or more techniques of this disclosure.

FIG. 7 is a graphical illustration of example capacitor voltage responses for the switching signal of FIG. 4, in accordance with one or more techniques of this disclosure. The abscissa axis (e.g., horizontal) of FIG. 7 represents time and the ordinate axis (e.g., vertical) of FIG. 7 represents a voltage 702 at capacitor 320 and a voltage 704 at capacitor 322. FIG. 7 is discussed with reference to FIG. 2 for exemplary purposes only.

Figure 18:
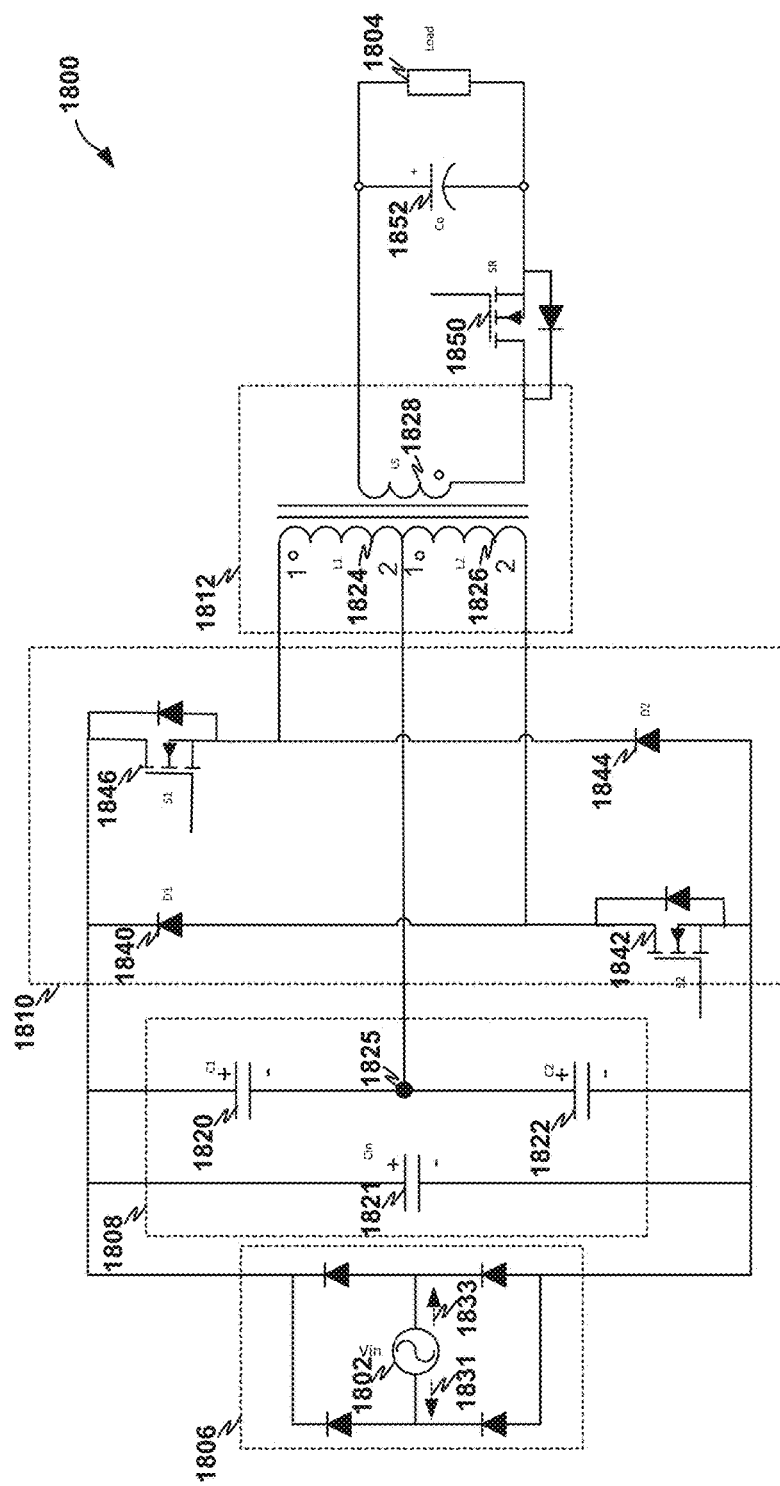
FIG. 18 is a circuit diagram illustrating an example Flyback converter using a center tap transformer, in accordance with one or more techniques of this disclosure.

Circuit 200 may permit use of a lower input capacitance compared to circuits that omit a multiple winding transformer by, for example, coupling of first primary side winding 224 and second primary side winding 226. In this way, one capacitor (e.g., capacitor 220 or capacitor 222) may charge the other capacitor (e.g., capacitor 222 or capacitor 220) with the lower voltage from the capacitor with the higher voltage. This ability is shown and illustrated in FIG. 7 during high line conditions. For example, when an input voltage from voltage source 202 is positive, voltage source 202 charges capacitor 220 via diode 230. Capacitor 222 is not directly charged due to the nature of the voltage doubler configuration of FIG. 2. However, at time range 712, when switching element 246 is turned on (e.g., activated) and switching element 242 is turned off (deactivated), the current through first primary side winding 224 induces a current in second primary side winding 226 conducting in the direction of charging capacitor 222 because the voltage of capacitor 222 is lower than the voltage of capacitor 220. However, when taking energy from capacitor 222, circuit 200 behaves as it normally would because energy will not transfer back to capacitor 220. In the example of FIG. 7, capacitor 220 and capacitor 222 may have a capacitance of 40 microfarads (μF) each for a 65 watt (W) adaptor design to operate at full power down to 90 Vrms. The common input capacitor size for a Flyback converter with similar requirements may be 120 microfarads (μF). Fundamentally, this behavior may also be observed in the circuit illustrated in FIG. 18 and at lower input voltages the coupled induced current would be higher. However, such behavior may be mitigated because capacitors 1820 and 1822 of FIG. 18 are relatively small.

Figure 8A:
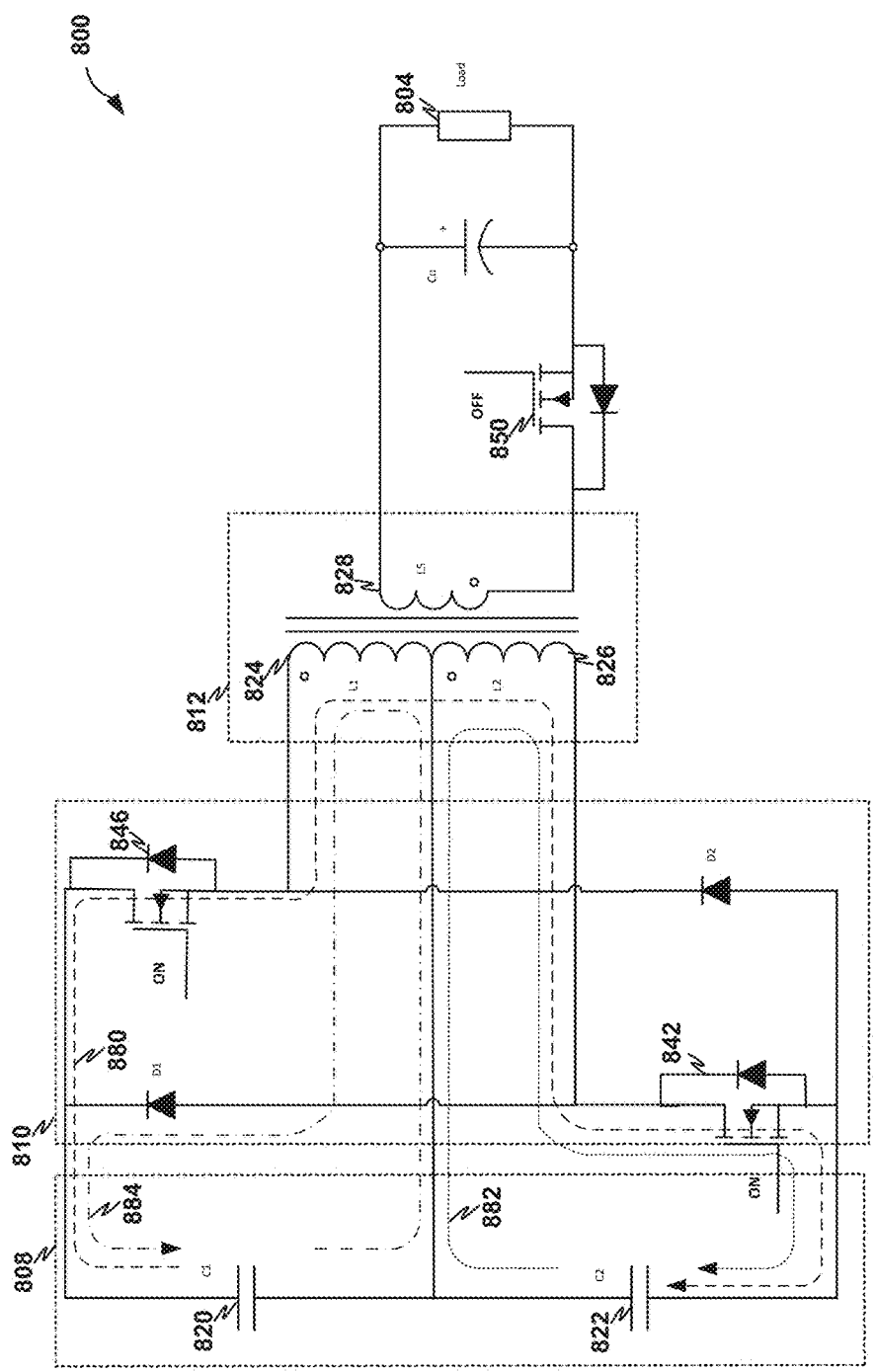
FIGS. 8A-8C are circuit diagrams illustrating a non-interleaving control scheme, in accordance with one or more techniques of this disclosure.
Figure 8B:
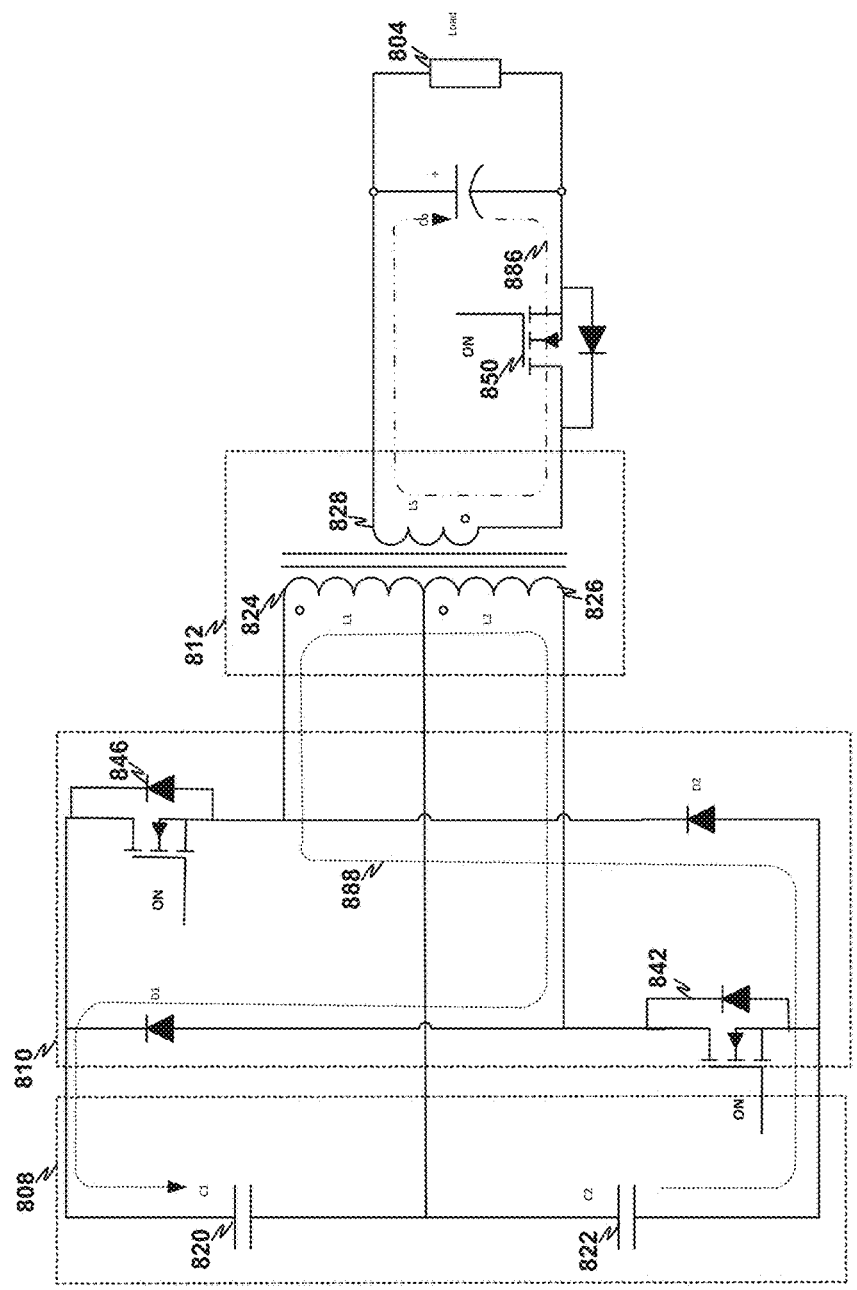
Figure 8C:
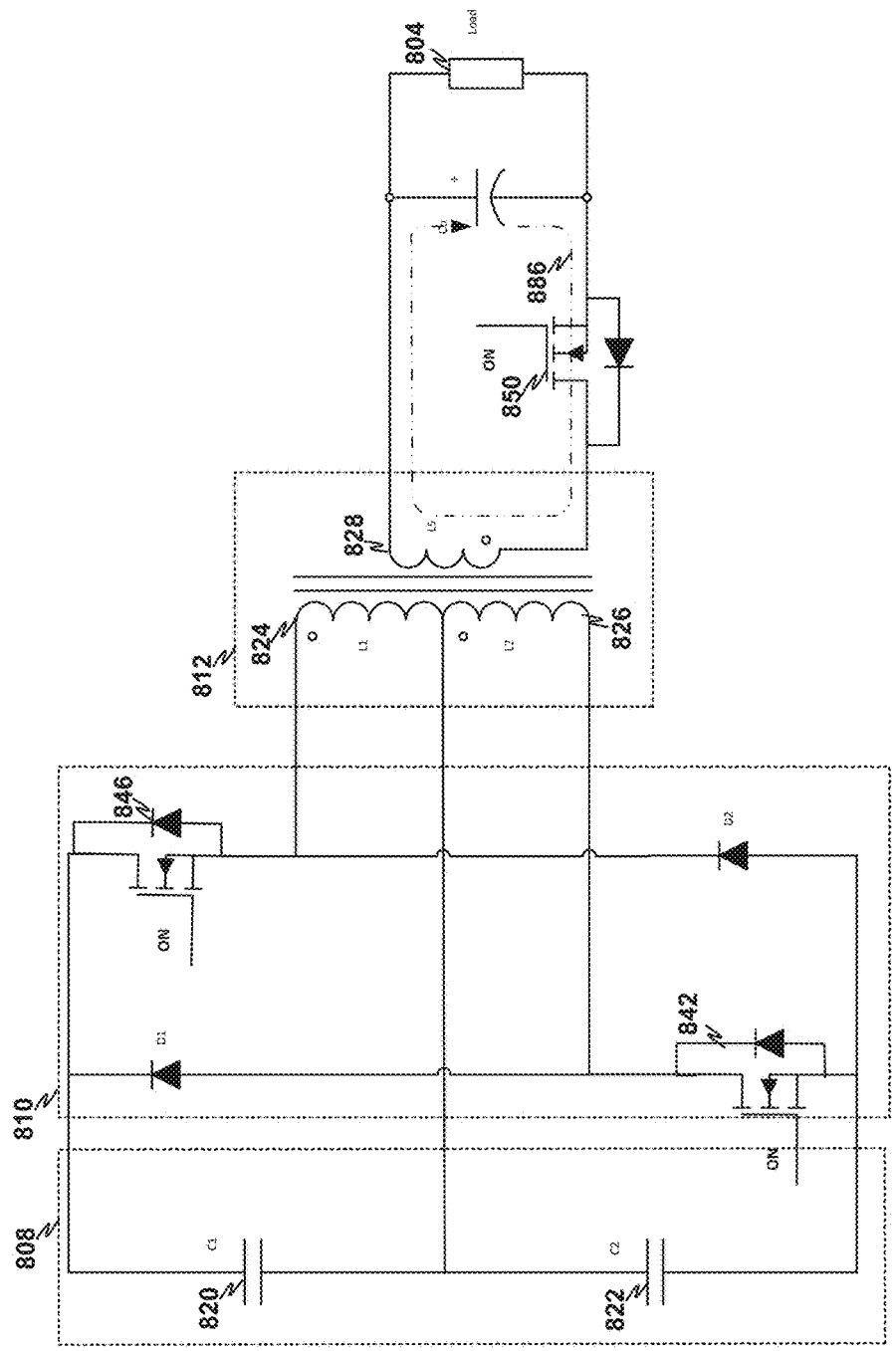

FIGS. 8A-8C are circuit diagrams illustrating a non-interleaving control scheme, in accordance with one or more techniques of this disclosure. As shown circuit 800 may include load 804, capacitor module 808, switching module 810, multiple winding transformer 812, synchronous rectifier 850. Capacitor module 808 may be an example of capacitor module 108 of FIG. 1 and/or capacitor module 208 of FIG. 2. For example, capacitor module 808 may include capacitor 820 and capacitor 822. Switching module 810 may be an example of switching module 110 of FIG. 1 and/or switching module 210 of FIG. 2. For example, switching module 810 may include switching elements 842 and 846. Multiple winding transformer 812 may be an example of multiple winding transformer 112 of FIG. 1 and/or multiple winding transformer 212 of FIG. 2. For example, multiple winding transformer 812 may include first primary side winding 824, second primary side winding 826, and secondary side winding 828.

FIG. 8A is a circuit diagram illustrating a first state for an exemplary non-interleaving control scheme. In the example of FIG. 8A, switching module 810 is configured to electrically couple a series combination of capacitor 820 and capacitor 822 to multiple winding transformer 812 such that the series combination of capacitor 820 and capacitor 822 charges the magnetic field of multiple winding transformer 812 as shown by current 880. In the example of FIG. 8A, the series combination of capacitor 820 and capacitor 822 may charge the magnetic field of multiple winding transformer 812 while capacitor 820 and capacitor 822 have a same voltage.

During the first state, switching module 810 electrically couples capacitor 820 to first primary side winding 824 and electrically couples capacitor 822 to second primary side winding 826 such that power flows from capacitor 820 to capacitor 822 when capacitor 820 has a higher voltage than capacitor 822 and such that power flows from capacitor 822 to capacitor 820 when capacitor 822 has a higher voltage than capacitor 820. In the example of FIG. 8A, capacitor 822 has a higher voltage than capacitor 820. As such, in this example, power flows from capacitor 822 to capacitor 820. More specifically, for example, current 882 flows from capacitor 822 to second primary side winding 826 and current 884 flows from first primary side winding 824 to capacitor 820.

FIG. 8B is a circuit diagram illustrating a first portion of a second state for an exemplary non-interleaving control scheme. In the example of FIG. 8B, switching module 810 electrically couples secondary side winding 828 to load 804 such that the magnetic field of multiple winding transformer 812 discharges to secondary side winding 828 to provide a regulated voltage to load 804 as shown by current 886. Additionally, in the example of FIG. 8B, during the second state, switching module 810 generates a channel for recuperating leakage inductance energy from a series combination of first primary side winding 824 and second primary side winding 826 to the series combination of capacitor 820 and capacitor 822 as shown by current 888.

FIG. 8C is a circuit diagram illustrating a second portion of the second state for an exemplary non-interleaving control scheme. In the example of FIG. 8C, switching module 810 electrically couples secondary side winding 828 to load 804 such that the magnetic field of multiple winding transformer 812 discharges to secondary side winding 828 to provide a regulated voltage to load 804 as shown by current 886. However, in the example of FIG. 8C, during the second state, leakage inductance energy has stopped flowing from the series combination of first primary side winding 824 and second primary side winding 826 to the series combination of capacitor 820 and capacitor 822.

Figure 9:
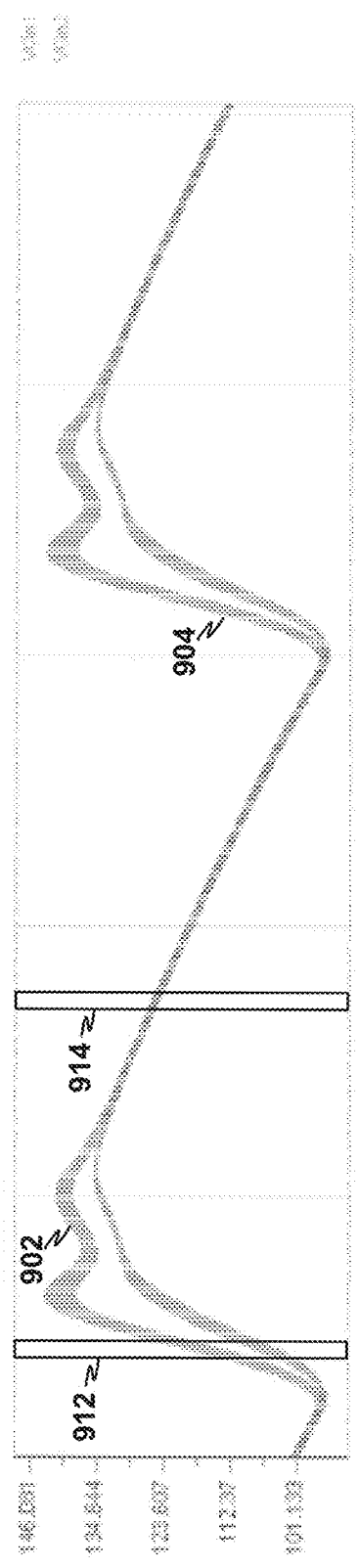
FIG. 9 is a graphical illustration of an example first operating point when a voltage at a first capacitor exceeds a voltage at a second capacitor and a second operating point when the voltage at the first capacitor does not exceed the voltage at the second capacitor, in accordance with one or more techniques of this disclosure.

FIG. 9 is a graphical illustration of example first operating point 912 when a voltage at a first capacitor exceeds a voltage at a second capacitor and a second operating point 914 when the voltage at the first capacitor does not exceed the voltage at the second capacitor, in accordance with one or more techniques of this disclosure. The abscissa axis (e.g., horizontal) of FIG. 9 represents time and the ordinate axis (e.g., vertical) of FIG. 9 represents a voltage 902 at capacitor 820 and a voltage 904 at capacitor 822.

Figure 10:
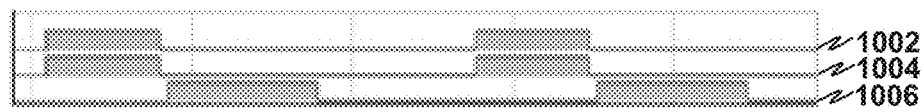
FIG. 10 is a graphical illustration of an example switching signal for the first operating point of FIG. 9, in accordance with one or more techniques of this disclosure.

FIG. 10 is a graphical illustration of an example switching signal for the first operating point 912 of FIG. 9, in accordance with one or more techniques of this disclosure. The abscissa axis (e.g., horizontal) of FIG. 10 represents time and the ordinate axis (e.g., vertical) of FIG. 10 represents a gate signal 1002 applied to switching element 846, a gate signal 1004 applied to switching element 842, and a gate signal 1006 applied to synchronous rectifier 850.

Figure 11:
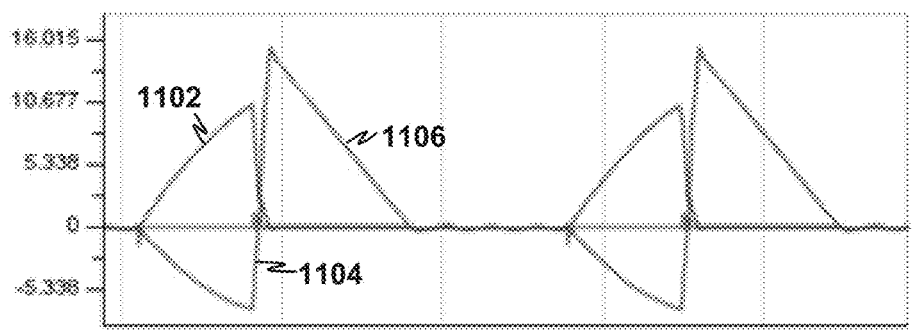
FIG. 11 is a graphical illustration of example current responses for the switching signal of FIG. 10, in accordance with one or more techniques of this disclosure.

FIG. 11 is a graphical illustration of example current responses for the switching signal of FIG. 10, in accordance with one or more techniques of this disclosure. The abscissa axis (e.g., horizontal) of FIG. 11 represents time and the ordinate axis (e.g., vertical) of FIG. 11 represents a current 1102 at first primary side winding 824, a current 1104 at second primary side winding 826, and a current 1106 at secondary side winding 828.

Figure 12:
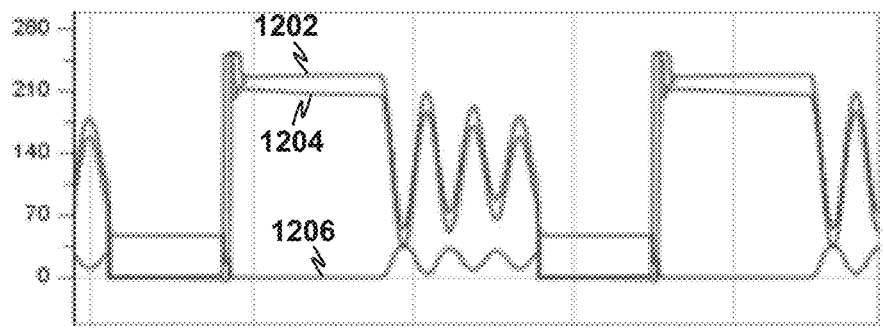
FIG. 12 is a graphical illustration of example voltage responses for the switching signal of FIG. 10, in accordance with one or more techniques of this disclosure.

FIG. 12 is a graphical illustration of example voltage responses for the switching signal of FIG. 10, in accordance with one or more techniques of this disclosure. The abscissa axis (e.g., horizontal) of FIG. 12 represents time and the ordinate axis (e.g., vertical) of FIG. 12 represents a drain to source voltage 1202 at switching element 846, a drain to source voltage 1204 at switching element 842, and a drain to source voltage 1206 at synchronous rectifier 850.

Figure 13:
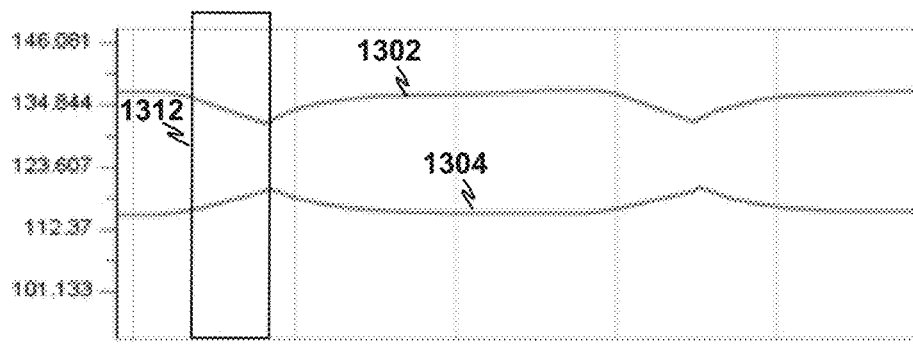
FIG. 13 is a graphical illustration of example capacitor voltage responses for the switching signal of FIG. 10, in accordance with one or more techniques of this disclosure.

FIG. 13 is a graphical illustration of example capacitor voltage responses for the switching signal of FIG. 10, in accordance with one or more techniques of this disclosure. The abscissa axis (e.g., horizontal) of FIG. 13 represents time and the ordinate axis (e.g., vertical) of FIG. 13 represents a voltage 1302 at capacitor 820 and a voltage 1304 at capacitor 822. As shown, at time range 1312, capacitor 820 charges capacitor 822.

Figure 14:
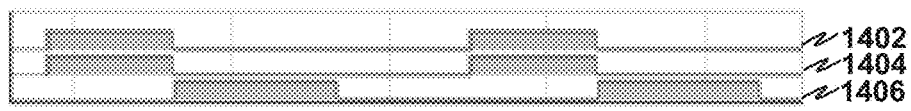
FIG. 14 is a graphical illustration of an example switching signal for the second operating point of FIG. 9, in accordance with one or more techniques of this disclosure.

FIG. 14 is a graphical illustration of an example switching signal for second operating point 914 of FIG. 9, in accordance with one or more techniques of this disclosure. The abscissa axis (e.g., horizontal) of FIG. 14 represents time and the ordinate axis (e.g., vertical) of FIG. 14 represents a gate signal 1402 applied to switching element 846, a gate signal 1404 applied to switching element 842, and a gate signal 1406 applied to synchronous rectifier 850.

Figure 15:
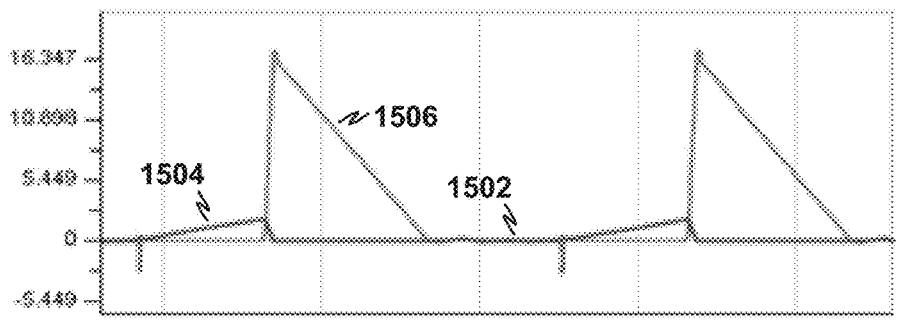
FIG. 15 is a graphical illustration of example current responses for the switching signal of FIG. 14, in accordance with one or more techniques of this disclosure.

FIG. 15 is a graphical illustration of example current responses for the switching signal of FIG. 14, in accordance with one or more techniques of this disclosure. The abscissa axis (e.g., horizontal) of FIG. 15 represents time and the ordinate axis (e.g., vertical) of FIG. 15 represents a current 1502 at first primary side winding 824, a current 1504 at second primary side winding 826, and a current 1506 at secondary side winding 828.

Figure 16:
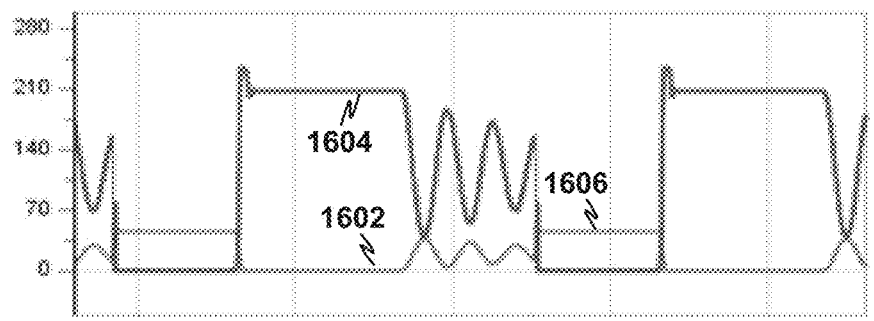
FIG. 16 is a graphical illustration of example voltage responses for the switching signal of FIG. 14, in accordance with one or more techniques of this disclosure.

FIG. 16 is a graphical illustration of example voltage responses for the switching signal of FIG. 14, in accordance with one or more techniques of this disclosure. The abscissa axis (e.g., horizontal) of FIG. 16 represents time and the ordinate axis (e.g., vertical) of FIG. 16 represents a drain to source voltage 1602 at switching element 846, a drain to source voltage 1604 at switching element 842, and a drain to source voltage 1606 at synchronous rectifier 850.

Figure 17:
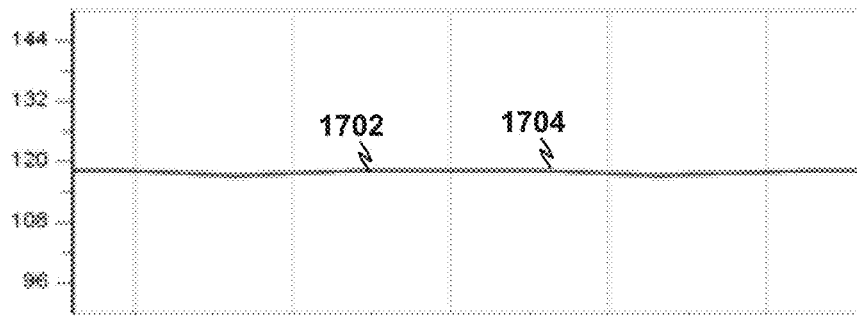
FIG. 17 is a graphical illustration of example capacitor voltage responses for the switching signal of FIG. 14, in accordance with one or more techniques of this disclosure.

FIG. 17 is a graphical illustration of example capacitor voltage responses for the switching signal of FIG. 14, in accordance with one or more techniques of this disclosure. The abscissa axis (e.g., horizontal) of FIG. 17 represents time and the ordinate axis (e.g., vertical) of FIG. 17 represents a voltage 1702 at capacitor 820 and a voltage 1704 at capacitor 822 (voltage 1704 blocks voltage 1702 in the graphical illustration of FIG. 17). As shown, capacitor 820 does not charge capacitor 822.

FIG. 18 is a circuit diagram illustrating an example Flyback converter using a center tap transformer, in accordance with one or more techniques of this disclosure. As shown circuit 1800 may include voltage source 1802, load 1804, rectification module 1806, capacitor module 1808, switching module 1810, multiple winding transformer 1812, synchronous rectifier 1850, and capacitor 1852. Voltage source 1802 may be an example of voltage source 102 of FIG. 1. Rectification module 1806 may be an example of rectification module 106 of FIG. 1. Capacitor module 1808 may be an example of capacitor module 108 of FIG. 1. For example, capacitor module 1808 may include capacitor 1820 and capacitor 1822. Switching module 1810 may be an example of switching module 110 of FIG. 1. Multiple winding transformer 1812 may be an example of multiple winding transformer 112 of FIG. 1. For example, multiple winding transformer 1812 may include first primary side winding 1824, second primary side winding 1826, and secondary side winding 1828. Synchronous rectifier 1850 may be an actively controlled switching element configured to act as a rectifier. For instance, synchronous rectifier 1850 may be activated to allow current in one direction and deactivated to block current in the other direction.

As shown in FIG. 18, capacitor 1820 includes a positive terminal and a negative terminal and capacitor 1822 includes a positive terminal and a negative terminal. Additionally, first primary side winding 1824 includes a first node and a second node and second primary side winding 1826 includes a first node and a second node. In the example of FIG. 18, the second node of first primary side winding 1824, the first node of second primary side winding 1826, the negative terminal of capacitor 1820, and the positive terminal of capacitor 1822 are coupled together at mid-point connection 1825. As shown, capacitor module 1808 may further include capacitor 1821 coupled in parallel with a series path formed by capacitor 1820 and capacitor 1822.

Rectification module 1806 may be configured to generate rectified current to charge capacitors 1820-1822 using an alternating current flowing when the alternating current flows in a first direction 1831 and generate rectified current to charge capacitors 1820-1822 using the alternating current when the alternating current flows in a second direction 1833 that is opposite to first direction 1831.

Switching module 1810 may include diode 1840, switching element 1842, diode 1844, and switching element 1846. In the example of FIG. 18, a cathode of diode 1840 is coupled to the positive terminal of capacitor 1820 and the anode of diode 1840 is coupled to the second node of second primary side winding 1826. In this example, a drain of first switching element 1842 is coupled to the anode of diode 1840 and a source of switching element 1842 is coupled to the negative terminal of capacitor 1822. Similarly, as shown, an anode of diode 1844 is coupled to the negative terminal of capacitor 1822 and the cathode of diode 1844 is coupled to the first node of first primary side winding 1824. In this example, a drain of switching element 1846 is coupled to the positive terminal of capacitor 1820 and a source of switching element 1846 is coupled to the cathode of diode 1844.

An example circuit of a center tapped (CT) Flyback is shown in FIG. 18. In this case, the total primary side winding (turn ratio) may be design for only low-line operation by, for example selecting between an interleaving control scheme and a non-interleaving control scheme. Because capacitor 1820 and capacitor 1822 form a voltage divider, the circuit 1800 may operate at low line input voltages in both high line and low line inputs of voltage source 1802. Therefore, multiple winding transformer 1812 may be designed to accommodate only low line conditions only. This means with recirculating paths, switching elements 1842 and 1846 may not necessarily operate with voltages above a maximum input voltage. Therefore, lower voltage rating switches can be used compared to circuits that omit a multiple winding transformer. In this case, for example, only a switching element with a voltage rating of 400 V may be used instead of necessarily using a switching element having a voltage rating of 650 V or higher.

Furthermore, multiple winding transformer 1812 may be optimized only for low line voltages. Because the input voltage may be halved at high line, a core loss of multiple winding transformer 1812 may also be approximately halved. This can be understood from the delta magnetic flux density (ΔB) equation:

$$\Delta B = (V\_in \; D)/(2 n A\_ef\_sw)$$

In the above equation, D is the duty cycle, n is the turn ratio, A_e is the effective area of the transformer core and f_sw is the switching frequency. Assuming f_sw, A_e and the power are fixed; at high line, D and V_in is approximately halved compared to low line, n is ~0.7 compared to high line and ΔB comes out as being ~0.7 compare to high line conditions with the same design. Using an E32 core with 3F3 material, switching at 140 kHz, the final core loss may result in ~0.4 of the losses compared to high line losses. This improvement may be even more dominant at higher switching frequencies. Furthermore, at high line operation, only one primary side switch may be ON at any time. As such, gate drive losses may be also reduced by half compared to circuits that omit a multiple winding transformer.

In this way, circuit 1800 may represent a system having the following benefits. Multiple winding transformer 1812 may be designed for only a "low line voltage" of voltage source 1802. For example, circuit 1800 may have a similar low line voltage on the primary side winding whether high line or low line. Switching module 1810 may be switched to allow recirculating current to capacitor 1820 and capacitor 1822 during turn off, thereby reducing snubber losses compared to circuits that omit a multiple winding transformer. Diodes 1840 and 1844 may only conduct leakage inductance current, thereby reducing loses compared to circuits that omit a multiple winding transformer. Switching elements 1842 and 1846 may only see a maximum voltage of ~340V. As such, a 400V device may be used. A control of switching module 1810 may be simplified by modifying existing controllers (e.g., similar control as existing Flyback converters).

Figure 19:
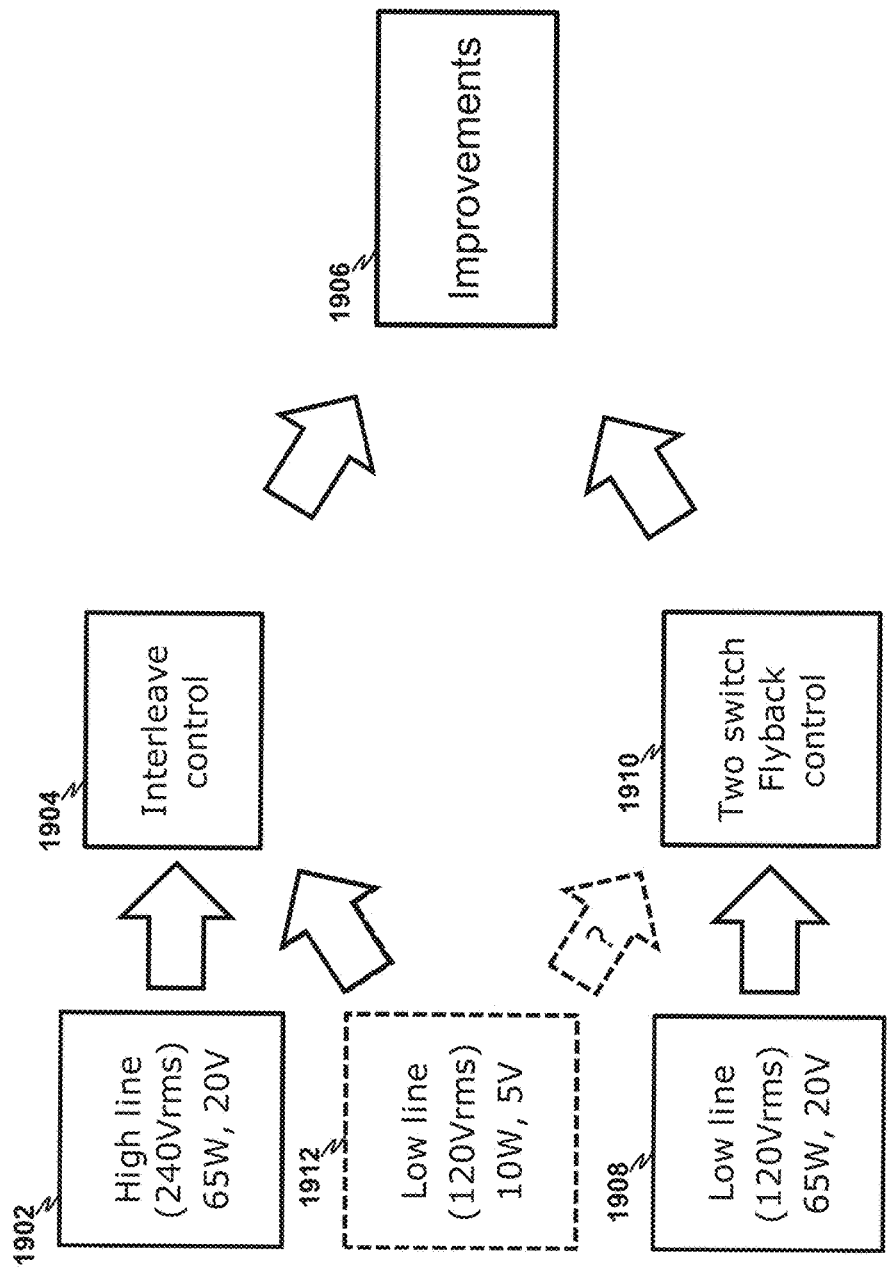
FIG. 19 is a block diagram illustrating an example process for selecting a control scheme for a power converter using a multiple winding transformer

FIG. 19 is a block diagram illustrating an example process for selecting a control scheme for a power converter using a multiple winding transformer. FIG. 19 is discussed with reference to FIG. 1 for exemplary purposes only.

The different control stated for low line and high line may be dynamically selected depending on the optimum efficiency point for operations beyond the state output. For example, with USB-PD the output voltage may be from 3V all the way to 20V. The efficiency point at 65 W at 20V may be different for 10 W at 5V output. It could be more efficient to operate a CT/VD-CT Flyback with high line control (interleaving control) at low line condition with output of 5V at 10 W instead of low line control (two switch Flyback control). This may reduce the transformer and gate drive losses which could be critical in improving efficiency at 10 W conditions. Therefore, the different control may not be static and may be selective depending on the situation.

For example, switching module 110 may determine that voltage source 102 outputs a "high line" (e.g., 240 Vrms) for a load 104 of 65 watts and 20 volts (1902). In response to determining that voltage source 102 outputs the "high line" (e.g., 240 Vrms), switching module 110 may select an interleaving control scheme (1904), which may result in improvements (1906) compared to systems that use only one control scheme. Said differently, switching module 110 may select an interleaving control scheme when a voltage at voltage source 102 supplying power to capacitor module 108 exceeds a first predetermined voltage (e.g., 120 Vrms to 180 Vrms).

In some examples, switching module 110 may determine that voltage source 102 outputs a "low line" (e.g., 120 Vrms) for a load 104 of 65 watts and 20 volts (1908). In response to determining that voltage source 102 outputs the "low line" (e.g., 120 Vrms) and that the load 104 is configured for 65 watts and 20 volts, switching module 110 may select a non-interleaving control scheme (e.g., "two switch Flyback control") (1910), which may result in improved efficiency (1906) compared to systems that use only one control scheme. Said differently, switching module 110 may select a non-interleaving control scheme when a voltage at voltage source 102 supplying power to capacitor module 108 does not exceed the first predetermined voltage (e.g., 120 Vrms to 180 Vrms) and a voltage output at the load exceeds a second predetermined voltage (e.g., 5 volts to 18 volts).

In some examples, switching module 110 may determine that voltage source 102 outputs a "low line" (e.g., 120 Vrms) for a load 104 of 10 watts and 5 volts (1912). In response to determining that voltage source 102 outputs the "low line" (e.g., 120 Vrms) and that the load 104 is configured for 10 watts and 5 volts, switching module 110 may select a non-interleaving control scheme (e.g., "two switch Flyback control") or an interleaving control scheme, which may result in improved efficiency (1906) compared to systems that use only one control scheme. Said differently, switching module 110 may select the interleaving control scheme when a voltage at voltage source 102 supplying power to capacitor module 108 does not exceed the first predetermined voltage (e.g., 120 Vrms to 180 Vrms) and a voltage output at the load does not exceed a second predetermined voltage (e.g., 5 volts to 18 volts). Although the example of FIG. 19 describes system 100 using multiple (e.g., two) control schemes, in some examples, system 100 of FIG. 1 may use only one control scheme. For example, switching module 110 may be configured to operate using only a non-interleaving control scheme. In some examples, switching module 110 may be configured to operate using only an interleaving control scheme.

Figure 20:
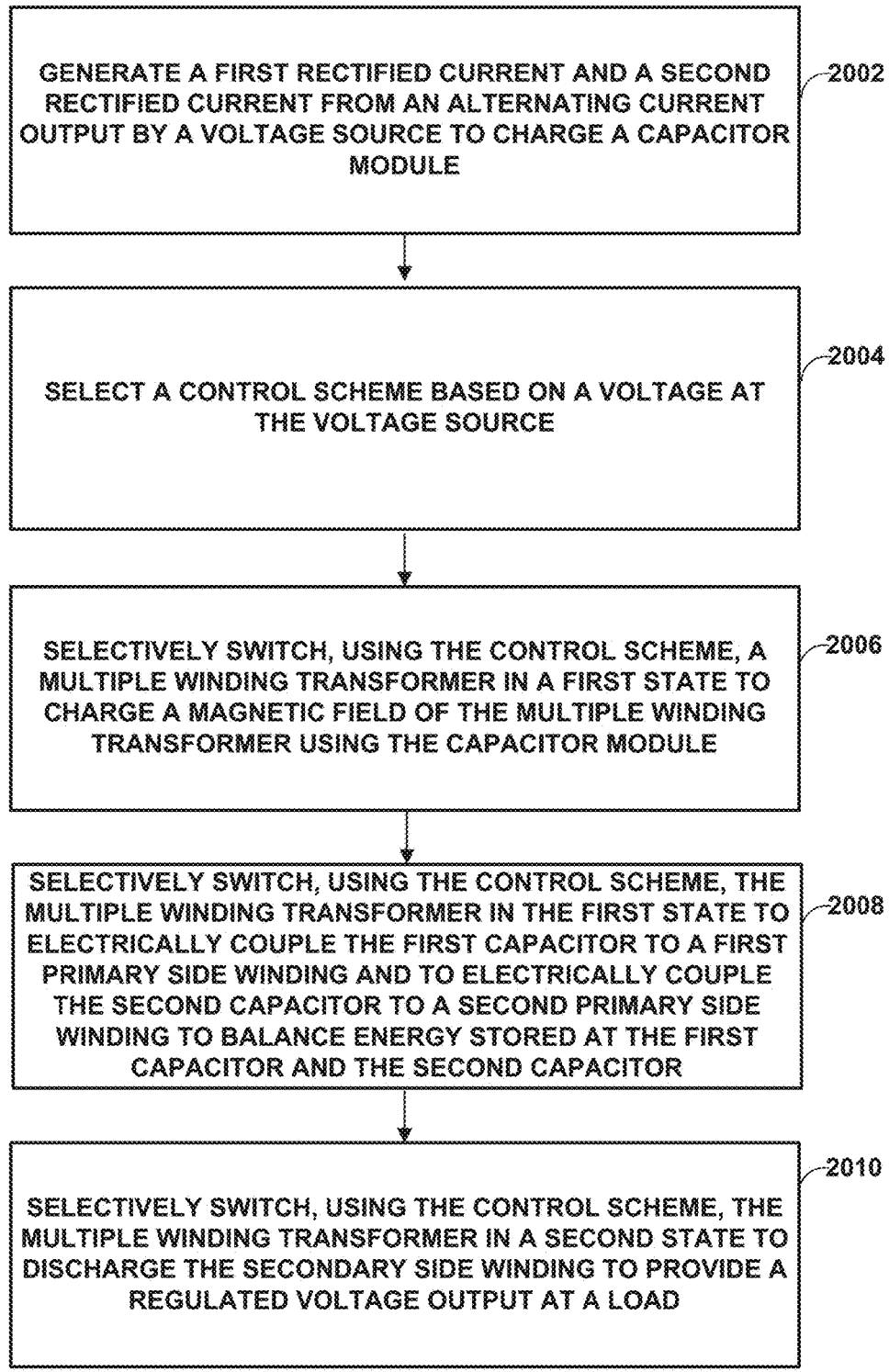
FIG. 20 is a flow diagram for operating a power converter using a multiple winding transformer that may be performed by a circuit in accordance with this disclosure.

FIG. 20 is a flow diagram for operating a power converter using a multiple winding transformer that may be performed by a circuit in accordance with this disclosure. FIG. 20 is discussed with reference to FIG. 1 for exemplary purposes only.

In accordance with one or more techniques of this disclosure, rectification module 106 generates a first rectified current and a second rectified current from an alternating current output by voltage source 102 to charge capacitor module 108 (2002). Switching module 110 selects a control scheme based on a voltage a voltage source 102 (2004). For example, switching module 110 selects an interleaving control scheme when a voltage at voltage source 102 exceeds a predefined voltage and selects a non-interleaving control scheme when the voltage at voltage source 102 does not exceed the predefined voltage.

Switching module 110 selectively switches, using the control scheme, multiple winding transformer 112 in a first state to charge a magnetic field of multiple winding transformer 112 using capacitor module 108 (2006). Switching module 110 selectively switches, using the control scheme, multiple winding transformer 112 in the first state to electrically couple capacitor 120 to first primary side winding 124 and to electrically couple capacitor 122 to second primary side winding 126 to balance energy stored at capacitor 120 and capacitor 122 (2008). Switching module 110 selectively switches, using the control scheme, multiple winding transformer 112 in a second state to discharge secondary side winding 128 to provide a regulated voltage output at load 104 (2010).

Figure 21:
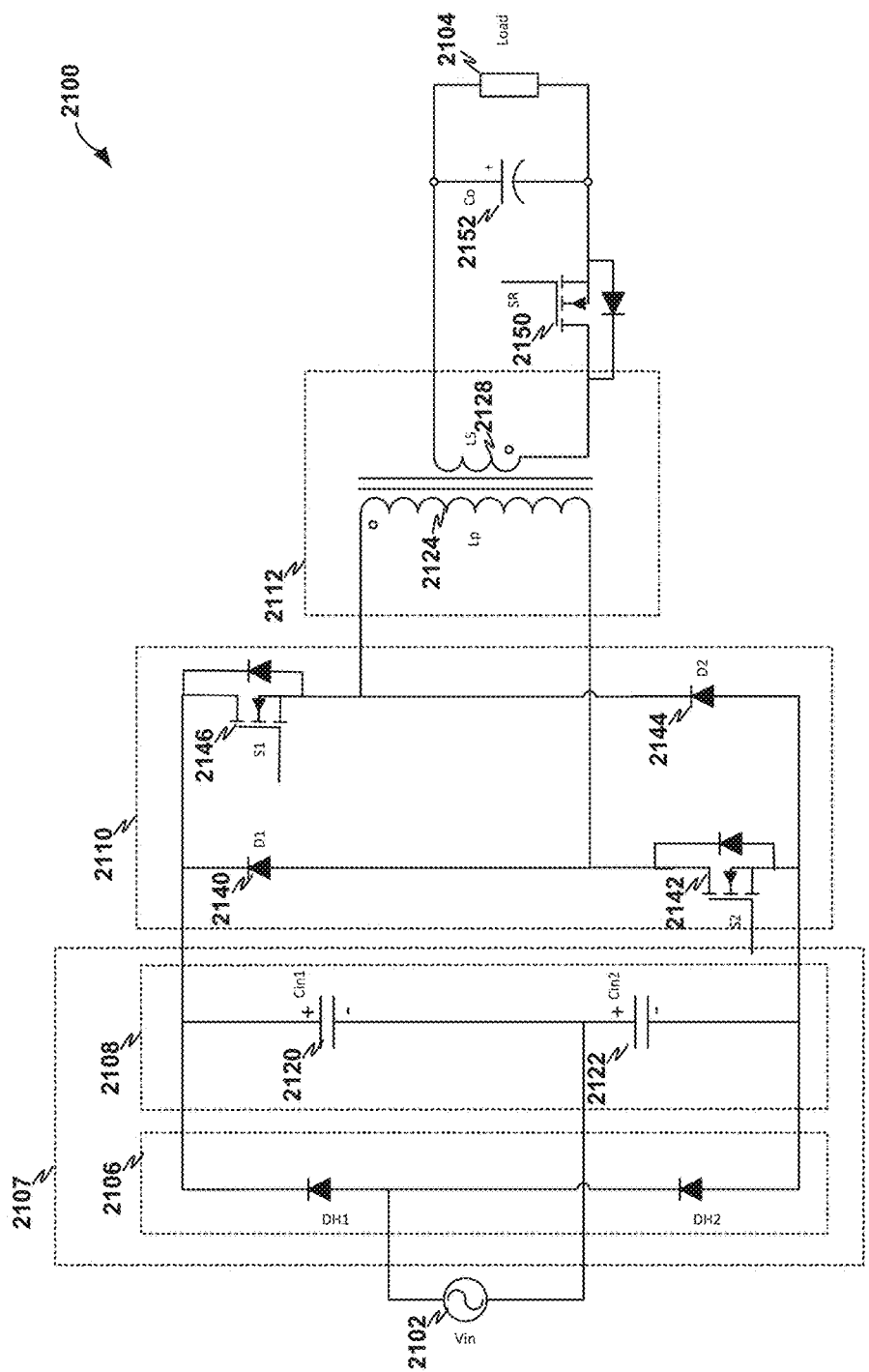
FIG. 21 is a circuit diagram illustrating an example Flyback converter using a voltage doubler, in accordance with one or more techniques of this disclosure.

FIG. 21 is a circuit diagram illustrating an example Flyback converter using a voltage doubler, in accordance with one or more techniques of this disclosure. Although FIG. 21 illustrates an example where switching module 2110 and transformer 2112 form a two-switch Flyback converter, other examples may use different topologies. As shown circuit 2100 may include voltage source 2102, load 2104, rectification module 2106, capacitor module 2108, switching module 2110, transformer 2112, synchronous rectifier 2150, and capacitor 2152. Voltage source 2102 may be an example of voltage source 102 of FIG. 1. Rectification module 2106 may be an example of rectification module 106 of FIG. 1. Capacitor module 2108 may be an example of capacitor module 108 of FIG. 1. For example, capacitor module 2108 may include capacitor 2120 and capacitor 2122. Switching module 2110 may be an example of switching module 110 of FIG. 1. Transformer 2112 may include a primary side winding 2124 and secondary side winding 2128. Synchronous rectifier 2150 may be an actively controlled switching element configured to act as a rectifier. For instance, synchronous rectifier 2150 may be activated to allow current in one direction and deactivated to block current in the other direction.

Rectification module 2106 and capacitor module 2108 may form a voltage doubler module 2107. As shown, voltage doubler module 2107 may include capacitor 2120 configured to receive power from an alternating current output by voltage source 2102 when the alternating current output by voltage source 2102 is positive. Similarly, as shown, voltage doubler module 2107 may include capacitor 2122 configured to receive power from the alternating current output by voltage source 2102 when the alternating current output by voltage source 2102 is negative. As shown, a positive terminal of capacitor 2122 is electrically coupled to a negative terminal of capacitor 2120.

Switching module 2110 may be configured to selectively couple primary side winding 2124 to capacitor module 2108 to regulate a voltage at secondary side winding 2128. As shown, switching module 2110 includes diode 2140, switching element 2142, diode 2144, and switching element 2146. In the example of FIG. 21, a cathode of diode 2140 is coupled to the positive terminal of capacitor 2120 and the anode of diode 2140 is coupled to the second node of second primary side winding 2126. In this example, a drain of first switching element 2142 is coupled to the anode of diode 2140 and a source of switching element 2142 is coupled to the negative terminal of capacitor 2122. Similarly, as shown, an anode of diode 2144 is coupled to the negative terminal of capacitor 2122 and the cathode of diode 2144 is coupled to the first node of first primary side winding 2124. In this example, a drain of switching element 2146 is coupled to the positive terminal of capacitor 2120 and a source of switching element 2146 is coupled to the cathode of diode 2144.

In this way, circuit 2100 may represent a system having the following benefits. Transformer 2112 may be designed for twice a "High line voltage" of voltage source 2102, which may reduce the overall current on the primary side. Transformer 211 may have very low primary side current compared to circuits that omit a voltage doubler. Rectification module 2106 may have half the bridge diode losses compared to circuits that omit a voltage doubler. Switching module 2110 may be switched to allow recirculating current to capacitor 2120 and capacitor 2122 during turn off, thereby reducing snubber losses compared to circuits that omit a voltage doubler. Circuit 2100 may allow for a smaller capacitance at capacitor module 2108. For example, a capacitance at capacitors 2120 and 2122 may be 60 uF for a 65 W (e.g., design for full power, stable operation at 100 Vrms). Diodes 2140 and 2144 may only conduct leakage inductance current, thereby reducing loses compared to circuits that omit a voltage doubler. A control of switching module 2110 may be simplified by reusing existing controllers (e.g., similar control as existing Flyback converters).

The following examples may illustrate one or more aspects of the disclosure.

Example 1

A circuit for voltage regulation comprising: a capacitor module comprising a first capacitor and a second capacitor;

a multiple winding transformer comprising a first primary side winding, a second primary side winding, and a secondary side winding; a switching module configured to selectively switch the multiple winding transformer in a first state and a second state; wherein, during the first state, the switching module electrically couples the capacitor module to the multiple winding transformer such that the capacitor module charges a magnetic field of the multiple winding transformer; wherein, during the first state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor; and wherein, during the second state, the switching module electrically couples the secondary side winding to a load such that the magnetic field of the multiple winding transformer discharges to the secondary side winding to provide a regulated voltage to the load.

Example 2

The circuit of example 1, further comprising a rectification module configured to: generate a first rectified current to charge the first capacitor using an alternating current flowing when the alternating current flows in a first direction; and generate a second rectified current to charge the second capacitor using the alternating current when the alternating current flows in a second direction that is opposite to the first direction.

Example 3

The circuit of any combination of examples 1-2, further comprising: wherein the rectification module comprises a first diode configured to generate a channel for the first rectified current and to block the second rectified current; and wherein the rectification module comprises a second diode configured to generate a channel for the second rectified current and to block the first rectified current.

Example 4

The circuit of any combination of examples 1-3, wherein the capacitor module further comprises a third capacitor coupled in parallel with a series path formed by the first capacitor and the second capacitor, the circuit further comprising a rectification module configured to: generate a first rectified current to charge the first capacitor, the second capacitor, and the third capacitor using an alternating current when the alternating current flows in a first direction; and generate a second rectified current to charge the first capacitor, the second capacitor, and the third capacitor using the alternating current when the alternating current flows in a second direction that is opposite to the first direction.

Example 5

The circuit of any combination of examples 1-4, wherein the first capacitor comprises a positive terminal and a negative terminal, wherein the second capacitor comprises a positive terminal and a negative terminal, wherein the first primary side winding comprises a first node and a second node, wherein the second primary side winding comprises a first node and a second node, wherein the second node of the first primary side winding, the first node of the second primary side winding, the negative terminal of the first capacitor, and the positive terminal of the second capacitor are coupled together, and wherein the switching module comprises: a first diode comprising an anode and a cathode, the cathode of the first diode being coupled to the positive terminal of the first capacitor and the anode of the first diode being coupled to the second node of the second primary side winding; a first switching element comprising a gate, drain, and source, the drain of the first switching element being coupled to the anode of the first diode and the source of the first switching element being coupled to the negative terminal of the second capacitor; a second diode comprising an anode and a cathode, the anode of the second diode being coupled to the negative terminal of the second capacitor and the cathode of the second diode being coupled to the first node of the first primary side winding; and a second switching element comprising a gate, drain, and source, the drain of the second switching element being coupled to the positive terminal of the first capacitor and the source of the second switching element being coupled to the cathode of the second diode.

Example 6

The circuit of any combination of examples 1-5, further comprising: wherein the first state is a first interleaving state and the second state is a second interleaving state; wherein, to electrically couple the capacitor module to the multiple winding transformer, the switching module is configured to electrically couple the second capacitor to the multiple winding transformer such that the second capacitor charges the magnetic field of the multiple winding transformer; wherein, during the second interleaving state, the switching module generates a channel for recuperating leakage inductance energy from the second primary side winding to the first capacitor; wherein the switching module is further configured to selectively switch the multiple winding transformer in a third interleaving state and a fourth interleaving state; wherein, during the third interleaving state, the switching module electrically couples the first capacitor to the multiple winding transformer such that the first capacitor charges the magnetic field of the multiple winding transformer; wherein, during the third interleaving state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor; wherein, during the fourth interleaving state, the switching module discharges the magnetic field of the multiple winding transformer to the secondary side winding to provide the regulated voltage to the load; and wherein, during the fourth interleaving state, the switching module generates a channel for recuperating leakage inductance energy from the first primary side winding to the second capacitor.

Example 7

The circuit of any combination of examples 1-6, further comprising: wherein, to electrically couple the capacitor module to the multiple winding transformer, the switching module is configured to electrically couple a series combination of the first capacitor and the second capacitor to the multiple winding transformer such that the series combination of the first capacitor and the second capacitor charges the magnetic field of the multiple winding transformer; and wherein, during the second state, the switching module generates a channel for recuperating leakage inductance energy from a series combination of the first primary side winding and the second primary side winding to the series combination of the first capacitor and the second capacitor.

Example 8

The circuit of any combination of examples 1-7, wherein the switching module is further configured to: select an interleaving control scheme when a voltage at a voltage source supplying power to the capacitor module exceeds a first predetermined voltage; select a non-interleaving control scheme when the voltage at the voltage source supplying power to the capacitor module does not exceed the first predetermined voltage and a voltage output at the load exceeds a second predetermined voltage; and select the interleaving control scheme when the voltage at the voltage source supplying power to the capacitor module does not exceed the first predetermined voltage and the voltage output at the load does not exceed the second predetermined voltage.

Example 9

The circuit of any combination of examples 1-8, wherein the switching module is further configured to operate using only a non-interleaving control scheme.

Example 10

A method for voltage regulation comprising: selectively switching, by a switching module, a multiple winding transformer in a first state and a second state, the multiple winding transformer comprising a first primary side winding, a second primary side winding, and a secondary side winding; wherein selectively switching the multiple winding transformer in the first state comprises electrically coupling a capacitor module to the multiple winding transformer such that the capacitor module charges a magnetic field of the multiple winding transformer, the capacitor module comprising a first capacitor and a second capacitor; wherein selectively switching the multiple winding transformer in the first state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor; and wherein selectively switching the multiple winding transformer in the second state comprises electrically coupling the secondary side winding to a load such that the magnetic field of the multiple winding transformer discharges to the secondary side winding to provide a regulated voltage to the load.

Example 11

The method of example 10, further comprising: generating, by a rectification module, a first rectified current to charge the first capacitor using an alternating current flowing when the alternating current flows in a first direction; and generating, by the rectification module, a second rectified current to charge the second capacitor using the alternating current when the alternating current flows in a second direction that is opposite to the first direction.

Example 12

The method of any combination of examples 10-11, further comprising: wherein the rectification module comprises a first diode configured to generate a channel for the first rectified current and to block the second rectified current; and wherein the rectification module comprises a second diode configured to generate a channel for the second rectified current and to block the first rectified current.

Example 13

The method of any combination of examples 10-12, wherein the capacitor module further comprises a third capacitor coupled in parallel with a series path formed by the first capacitor and the second capacitor, the method further comprising: generating a first rectified current to charge the first capacitor, the second capacitor, and the third capacitor using an alternating current when the alternating current flows in a first direction; and generating a second rectified current to charge the first capacitor, the second capacitor, and the third capacitor using the alternating current when the alternating current flows in a second direction that is opposite to the first direction.

Example 14

The method of any combination of examples 10-13, wherein the first capacitor comprises a positive terminal and a negative terminal, wherein the second capacitor comprises a positive terminal and a negative terminal, wherein the first primary side winding comprises a first node and a second node, wherein the second primary side winding comprises a first node and a second node, wherein the second node of the first primary side winding, the first node of the second primary side winding, the negative terminal of the first capacitor, and the positive terminal of the second capacitor are coupled together, and wherein the switching module comprises: a first diode comprising an anode and a cathode, the cathode of the first diode being coupled to the positive terminal of the first capacitor and the anode of the first diode being coupled to the second node of the second primary side winding; a first switching element comprising a gate, drain, and source, the drain of the first switching element being coupled to the anode of the first diode and the source of the first switching element being coupled to the negative terminal of the second capacitor; a second diode comprising an anode and a cathode, the anode of the second diode being coupled to the negative terminal of the second capacitor and the cathode of the second diode being coupled to the first node of the first primary side winding; and a second switching element comprising a gate, drain, and source, the drain of the second switching element being coupled to the positive terminal of the first capacitor and the source of the second switching element being coupled to the cathode of the second diode.

Example 15

The method of any combination of examples 10-14, further comprising: wherein the first state is a first interleaving state and the second state is a second interleaving state; wherein electrically coupling the capacitor module to the multiple winding transformer comprises electrically coupling the second capacitor to the multiple winding transformer such that the second capacitor charges the magnetic field of the multiple winding transformer; wherein selectively switching the multiple winding transformer in the second interleaving state comprises generating a channel for recuperating leakage inductance energy from the second primary side winding to the first capacitor; selectively switching, by the switching module, the multiple winding transformer in a third interleaving state and a fourth interleaving state; wherein selectively switching the multiple winding transformer in the third interleaving state comprises electrically coupling the first capacitor to the multiple winding transformer such that the first capacitor charges the magnetic field of the multiple winding transformer; wherein selectively switching the multiple winding transformer in the third interleaving state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor; wherein selectively switching the multiple winding transformer in the fourth interleaving state comprises generating a channel for recuperating leakage inductance energy from the first primary side winding to the second capacitor and wherein selectively switching the multiple winding transformer in the fourth interleaving state comprises electrically coupling the secondary side winding to the load such that the magnetic field of the multiple winding transformer discharges to the secondary side winding to provide a regulated voltage to the load.

Example 16

The method of any combination of examples 10-15, further comprising: wherein electrically coupling the capacitor module to the multiple winding transformer comprises electrically coupling a series combination of the first capacitor and the second capacitor to the multiple winding transformer such that the series combination of the first capacitor and the second capacitor charges the magnetic field of the multiple winding transformer; and wherein selectively switching the multiple winding transformer in the second state comprises generating a channel for recuperating leakage inductance energy from a series combination of the first primary side winding and the second primary side winding to the series combination of the first capacitor and the second capacitor.

Example 17

The method of any combination of examples 10-16, further comprising: selecting, by the switching module, an interleaving control scheme when a voltage at a voltage source supplying power to the capacitor module exceeds a first predetermined voltage; selecting, by the switching module, a non-interleaving control scheme when the voltage at the voltage source supplying power to the capacitor module does not exceed the first predetermined voltage and a voltage output at the load exceeds a second predetermined voltage; and selecting, by the switching module, the interleaving control scheme when the voltage at the voltage source supplying power to the capacitor module does not exceed the first predetermined voltage and the voltage output at the load does not exceed the second predetermined voltage.

Example 18

The method of any combination of examples 10-17, wherein the switching module is further configured to operate using only a non-interleaving control scheme.

Example 19

A circuit for voltage regulation comprising: a voltage doubler module comprising: a first capacitor configured to receive power from an alternating current output by a voltage source when the alternating current output by the voltage source is positive; and a second capacitor configured to receive power from an alternating current output by a voltage source when the alternating current output by the voltage source is negative, a positive terminal of the second capacitor being electrically coupled to a negative terminal of the first capacitor; a transformer comprising a primary side winding and a secondary side winding; and a switching module configured to selectively couple the primary side winding to the capacitor module to regulate a voltage at the secondary side winding.

Example 20

The circuit of example 19, wherein the transformer and the switching module form a two-switch Flyback converter.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:
1. A circuit for voltage regulation comprising:
  a capacitor module comprising a first capacitor and a second capacitor;

a multiple winding transformer comprising a first primary side winding, a second primary side winding, and a secondary side winding;

a switching module configured to selectively switch the multiple winding transformer in a first state and a second state;

wherein, during the first state, the switching module electrically couples the capacitor module to the multiple winding transformer such that the capacitor module charges a magnetic field of the multiple winding transformer;

wherein, during the first state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;

wherein, during the second state, the switching module electrically couples the secondary side winding to a load such that the magnetic field of the multiple winding transformer discharges to the secondary side winding to provide a regulated voltage to the load; and wherein the switching module is further configured to:
select an interleaving control scheme when a voltage at a voltage source supplying power to the capacitor module exceeds a first predetermined voltage;
select a non-interleaving control scheme when the voltage at the voltage source supplying power to the capacitor module does not exceed the first predetermined voltage and a voltage output at the load exceeds a second predetermined voltage; and
select the interleaving control scheme when the voltage at the voltage source supplying power to the capacitor module does not exceed the first predetermined voltage and the voltage output at the load does not exceed the second predetermined voltage.

2. The circuit of claim 1, further comprising a rectification module configured to:
generate a first rectified current to charge the first capacitor using an alternating current flowing when the alternating current flows in a first direction; and
generate a second rectified current to charge the second capacitor using the alternating current when the alternating current flows in a second direction that is opposite to the first direction.

3. The circuit of claim 2, further comprising:
wherein the rectification module comprises a first diode configured to generate a channel for the first rectified current and to block the second rectified current; and
wherein the rectification module comprises a second diode configured to generate a channel for the second rectified current and to block the first rectified current.

4. The circuit of claim 1, wherein the capacitor module further comprises a third capacitor coupled in parallel with a series path formed by the first capacitor and the second capacitor, the circuit further comprising a rectification module configured to:
generate a first rectified current to charge the first capacitor, the second capacitor, and the third capacitor using an alternating current when the alternating current flows in a first direction; and
generate a second rectified current to charge the first capacitor, the second capacitor, and the third capacitor using the alternating current when the alternating current flows in a second direction that is opposite to the first direction.

5. The circuit of claim 1, wherein the first capacitor comprises a positive terminal and a negative terminal, wherein the second capacitor comprises a positive terminal and a negative terminal, wherein the first primary side winding comprises a first node and a second node, wherein the second primary side winding comprises a first node and a second node, wherein the second node of the first primary side winding, the first node of the second primary side winding, the negative terminal of the first capacitor, and the positive terminal of the second capacitor are coupled together, and wherein the switching module comprises:
a first diode comprising an anode and a cathode, the cathode of the first diode being coupled to the positive terminal of the first capacitor and the anode of the first diode being coupled to the second node of the second primary side winding;
a first switching element comprising a gate, drain, and source, the drain of the first switching element being coupled to the anode of the first diode and the source of the first switching element being coupled to the negative terminal of the second capacitor;
a second diode comprising an anode and a cathode, the anode of the second diode being coupled to the negative terminal of the second capacitor and the cathode of the second diode being coupled to the first node of the first primary side winding; and
a second switching element comprising a gate, drain, and source, the drain of the second switching element being coupled to the positive terminal of the first capacitor and the source of the second switching element being coupled to the cathode of the second diode.

6. A circuit for voltage regulation comprising:
a capacitor module comprising a first capacitor and a second capacitor;
a multiple winding transformer comprising a first primary side winding, a second primary side winding, and a secondary side winding;
a switching module configured to selectively switch the multiple winding transformer in a first state and a second state;
wherein, during the first state, the switching module electrically couples the capacitor module to the multiple winding transformer such that the capacitor module charges a magnetic field of the multiple winding transformer;
wherein, during the first state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;
wherein, during the second state, the switching module electrically couples the secondary side winding to a load such that the magnetic field of the multiple winding transformer discharges to the secondary side winding to provide a regulated voltage to the load;
wherein the first state is a first interleaving state and the second state is a second interleaving state;
wherein, to electrically couple the capacitor module to the multiple winding transformer, the switching module is configured to electrically couple the second capacitor to the multiple winding transformer such that the second capacitor charges the magnetic field of the multiple winding transformer;

wherein, during the second interleaving state, the switching module generates a channel for recuperating leakage inductance energy from the second primary side winding to the first capacitor;

wherein the switching module is further configured to selectively switch the multiple winding transformer in a third interleaving state and a fourth interleaving state;

wherein, during the third interleaving state, the switching module electrically couples the first capacitor to the multiple winding transformer such that the first capacitor charges the magnetic field of the multiple winding transformer;

wherein, during the third interleaving state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;

wherein, during the fourth interleaving state, the switching module discharges the magnetic field of the multiple winding transformer to the secondary side winding to provide the regulated voltage to the load; and wherein, during the fourth interleaving state, the switching module generates a channel for recuperating leakage inductance energy from the first primary side winding to the second capacitor.

7. A circuit for voltage regulation comprising:
a capacitor module comprising a first capacitor and a second capacitor;
a multiple winding transformer comprising a first primary side winding, a second primary side winding, and a secondary side winding;
a switching module configured to selectively switch the multiple winding transformer in a first state and a second state;
wherein, during the first state, the switching module electrically couples the capacitor module to the multiple winding transformer such that the capacitor module charges a magnetic field of the multiple winding transformer;
wherein, during the first state, the switching module electrically couples the first capacitor to the first primary side winding and electrically couples the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;
wherein, during the second state, the switching module electrically couples the secondary side winding to a load such that the magnetic field of the multiple winding transformer discharges to the secondary side winding to provide a regulated voltage to the load;
wherein, to electrically couple the capacitor module to the multiple winding transformer, the switching module is configured to electrically couple a series combination of the first capacitor and the second capacitor to the multiple winding transformer such that the series combination of the first capacitor and the second capacitor charges the magnetic field of the multiple winding transformer; and wherein, during the second state, the switching module generates a channel for recuperating leakage inductance energy from a series combination of the first primary side winding and the second primary side winding to the series combination of the first capacitor and the second capacitor.

8. The circuit of claim 7, wherein the switching module is further configured to operate using only a non-interleaving control scheme.

9. A method for voltage regulation comprising:
selectively switching, by a switching module, a multiple winding transformer in a first state and a second state, the multiple winding transformer comprising a first primary side winding, a second primary side winding, and a secondary side winding;
wherein selectively switching the multiple winding transformer in the first state comprises electrically coupling a capacitor module to the multiple winding transformer such that the capacitor module charges a magnetic field of the multiple winding transformer, the capacitor module comprising a first capacitor and a second capacitor;
wherein selectively switching the multiple winding transformer in the first state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;
wherein selectively switching the multiple winding transformer in the second state comprises electrically coupling the secondary side winding to a load such that the magnetic field of the multiple winding transformer discharges to the secondary side winding to provide a regulated voltage to the load;
selecting, by the switching module, an interleaving control scheme when a voltage at a voltage source supplying power to the capacitor module exceeds a first predetermined voltage;
selecting, by the switching module, a non-interleaving control scheme when the voltage at the voltage source supplying power to the capacitor module does not exceed the first predetermined voltage and a voltage output at the load exceeds a second predetermined voltage; and
selecting, by the switching module, the interleaving control scheme when the voltage at the voltage source supplying power to the capacitor module does not exceed the first predetermined voltage and the voltage output at the load does not exceed the second predetermined voltage.

10. The method of claim 9, further comprising:
generating, by a rectification module, a first rectified current to charge the first capacitor using an alternating current flowing when the alternating current flows in a first direction; and
generating, by the rectification module, a second rectified current to charge the second capacitor using the alternating current when the alternating current flows in a second direction that is opposite to the first direction.

11. The method of claim 10, further comprising:
wherein the rectification module comprises a first diode configured to generate a channel for the first rectified current and to block the second rectified current; and
wherein the rectification module comprises a second diode configured to generate a channel for the second rectified current and to block the first rectified current.

12. The method of claim 9, wherein the capacitor module further comprises a third capacitor coupled in parallel with a series path formed by the first capacitor and the second capacitor, the method further comprising:
generating a first rectified current to charge the first capacitor, the second capacitor, and the third capacitor using an alternating current when the alternating current flows in a first direction; and
generating a second rectified current to charge the first capacitor, the second capacitor, and the third capacitor using the alternating current when the alternating current flows in a second direction that is opposite to the first direction.

13. The method of claim 9, wherein the first capacitor comprises a positive terminal and a negative terminal, wherein the second capacitor comprises a positive terminal and a negative terminal, wherein the first primary side winding comprises a first node and a second node, wherein the second primary side winding comprises a first node and a second node, wherein the second node of the first primary side winding, the first node of the second primary side winding, the negative terminal of the first capacitor, and the positive terminal of the second capacitor are coupled together, and wherein the switching module comprises:
a first diode comprising an anode and a cathode, the cathode of the first diode being coupled to the positive terminal of the first capacitor and the anode of the first diode being coupled to the second node of the second primary side winding;
a first switching element comprising a gate, drain, and source, the drain of the first switching element being coupled to the anode of the first diode and the source of the first switching element being coupled to the negative terminal of the second capacitor;
a second diode comprising an anode and a cathode, the anode of the second diode being coupled to the negative terminal of the second capacitor and the cathode of the second diode being coupled to the first node of the first primary side winding; and
a second switching element comprising a gate, drain, and source, the drain of the second switching element being coupled to the positive terminal of the first capacitor and the source of the second switching element being coupled to the cathode of the second diode.

14. A method for voltage regulation comprising:
selectively switching, by a switching module, a multiple winding transformer in a first state and a second state, the multiple winding transformer comprising a first primary side winding, a second primary side winding, and a secondary side winding;
wherein selectively switching the multiple winding transformer in the first state comprises electrically coupling a capacitor module to the multiple winding transformer such that the capacitor module charges a magnetic field of the multiple winding transformer, the capacitor module comprising a first capacitor and a second capacitor;
wherein selectively switching the multiple winding transformer in the first state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;
wherein selectively switching the multiple winding transformer in the second state comprises electrically coupling the secondary side winding to a load such that the magnetic field of the multiple winding transformer discharges to the secondary side winding to provide a regulated voltage to the load;
wherein the first state is a first interleaving state and the second state is a second interleaving state;
wherein electrically coupling the capacitor module to the multiple winding transformer comprises electrically coupling the second capacitor to the multiple winding transformer such that the second capacitor charges the magnetic field of the multiple winding transformer;
wherein selectively switching the multiple winding transformer in the second interleaving state comprises generating a channel for recuperating leakage inductance energy from the second primary side winding to the first capacitor;
selectively switching, by the switching module, the multiple winding transformer in a third interleaving state and a fourth interleaving state;
wherein selectively switching the multiple winding transformer in the third interleaving state comprises electrically coupling the first capacitor to the multiple winding transformer such that the first capacitor charges the magnetic field of the multiple winding transformer;
wherein selectively switching the multiple winding transformer in the third interleaving state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;
wherein selectively switching the multiple winding transformer in the fourth interleaving state comprises generating a channel for recuperating leakage inductance energy from the first primary side winding to the second capacitor; and
wherein selectively switching the multiple winding transformer in the fourth interleaving state comprises electrically coupling the secondary side winding to the load such that the magnetic field of the multiple winding transformer discharges to the secondary side winding to provide a regulated voltage to the load.

15. A method for voltage regulation comprising:
selectively switching, by a switching module, a multiple winding transformer in a first state and a second state, the multiple winding transformer comprising a first primary side winding, a second primary side winding, and a secondary side winding;
wherein selectively switching the multiple winding transformer in the first state comprises electrically coupling a capacitor module to the multiple winding transformer such that the capacitor module charges a magnetic field of the multiple winding transformer, the capacitor module comprising a first capacitor and a second capacitor;

wherein selectively switching the multiple winding transformer in the first state comprises electrically coupling the first capacitor to the first primary side winding and electrically coupling the second capacitor to the second primary side winding such that power flows from the first capacitor to the second capacitor when the first capacitor has a higher voltage than the second capacitor and such that power flows from the second capacitor to the first capacitor when the second capacitor has a higher voltage than the first capacitor;

wherein selectively switching the multiple winding transformer in the second state comprises electrically coupling the secondary side winding to a load such that the magnetic field of the multiple winding transformer discharges to the secondary side winding to provide a regulated voltage to the load;

wherein electrically coupling the capacitor module to the multiple winding transformer comprises electrically coupling a series combination of the first capacitor and the second capacitor to the multiple winding transformer such that the series combination of the first capacitor and the second capacitor charges the magnetic field of the multiple winding transformer; and wherein selectively switching the multiple winding transformer in the second state comprises generating a channel for recuperating leakage inductance energy from a series combination of the first primary side winding and the second primary side winding to the series combination of the first capacitor and the second capacitor.

16. The method of claim 15, wherein the switching module is further configured to operate using only a non-interleaving control scheme.

* * * * *